(12) United States Patent
Lante et al.

(10) Patent No.: US 11,427,507 B2
(45) Date of Patent: Aug. 30, 2022

(54) MINERAL ROOFING GRANULES AND METHODS FOR MAKING THEM

(71) Applicant: CertainTeed LLC, Malvern, PA (US)

(72) Inventors: Bojana Lante, Northborough, MA (US); Tracy Panzarella, Norwood, MA (US); Rachel Z. Pytel, Newton, MA (US)

(73) Assignee: CertainTeed LLC, Malvern, PA (US)

( * ) Notice: Subject to any disclaimer, the term of this patent is extended or adjusted under 35 U.S.C. 154(b) by 0 days.

(21) Appl. No.: 15/857,742

(22) Filed: Dec. 29, 2017

(65) Prior Publication Data

US 2018/0186694 A1 Jul. 5, 2018

Related U.S. Application Data

(60) Provisional application No. 62/610,991, filed on Dec. 28, 2017, provisional application No. 62/441,199, filed on Dec. 31, 2016.

(51) Int. Cl.
| | |
|---|---|
| *C04B 20/10* | (2006.01) |
| *C04B 26/26* | (2006.01) |
| *C04B 28/26* | (2006.01) |
| *C04B 111/20* | (2006.01) |

(Continued)

(52) U.S. Cl.
CPC ...... *C04B 20/1074* (2013.01); *C04B 20/1066* (2013.01); *C04B 26/26* (2013.01); *C04B 28/26* (2013.01); *C04B 2111/00586* (2013.01); *C04B 2111/2092* (2013.01); *C04B 2111/80* (2013.01)

(58) Field of Classification Search
None
See application file for complete search history.

(56) References Cited

U.S. PATENT DOCUMENTS

| | | |
|---|---|---|
| 4,251,265 A | 2/1981 | Stratton et al. |
| 4,440,866 A | 4/1984 | Lunghofer et al. |
| 4,555,493 A | 11/1985 | Watson et al. |

(Continued)

FOREIGN PATENT DOCUMENTS

WO 2015112590 A1 7/2015

OTHER PUBLICATIONS

Yuanyuan Tang and Kaimin Shih, "Mechanisms of zinc incorporation in aluminosilicate crystalline structures and the leaching behaviour of product phases", Environmental Technology, 36(3), 2977-2986 (2015).

*Primary Examiner* — Ronak C Patel
(74) *Attorney, Agent, or Firm* — McDonnell Boehnen Hulbert & Berghoff LLP

(57) ABSTRACT

The present disclosure relates to roofing granules, such as solar-reflective roofing granules having one or more of low crystalline silica content, high stain resistance and algae resistance. The present disclosure provides a mineral roofing granule having at its mineral outer surface a first fired mixture comprising an aluminosilicate clay, the first fired material having no more than 2 wt % crystalline silica. The present disclosure also provides a mineral roofing granule having a mineral body and a mineral outer surface, the mineral roofing granule having at its mineral outer surface a first fired material, the first fired material being a first fired mixture comprising an aluminosilicate clay; one or more of a feldspar, a sodium silicate and a nepheline syenite; and, optionally, a zinc source.

19 Claims, 24 Drawing Sheets

(51) Int. Cl.
*C04B 111/00* (2006.01)
*C04B 111/80* (2006.01)

(56) References Cited

U.S. PATENT DOCUMENTS

| | | | |
|---|---|---|---|
| 4,639,427 A | 1/1987 | Khaund | |
| 4,668,645 A | 5/1987 | Khaund | |
| 4,712,203 A | 12/1987 | Saito et al. | |
| 4,717,614 A | 1/1988 | Bondoc et al. | |
| 4,879,181 A | 11/1989 | Fitzgibbon | |
| 4,921,820 A | 5/1990 | Rumpf et al. | |
| 4,944,905 A | 7/1990 | Gibb et al. | |
| 5,120,455 A | 6/1992 | Lunghofer | |
| 5,175,133 A | 12/1992 | Smith et al. | |
| 6,569,520 B1 | 5/2003 | Jacobs | |
| 6,753,299 B2 | 6/2004 | Lunghofer et al. | |
| 6,983,797 B2 | 1/2006 | Nguyen et al. | |
| 7,036,591 B2 | 5/2006 | Cannan et al. | |
| 7,678,723 B2 | 3/2010 | Duenckel et al. | |
| 7,811,630 B2 | 10/2010 | Hong et al. | |
| 8,039,048 B2 | 10/2011 | Hong | |
| 8,668,954 B2 | 3/2014 | Hong et al. | |
| 8,722,140 B2 | 5/2014 | Shiao et al. | |
| 9,303,407 B2 | 4/2016 | Sexauer et al. | |
| 2003/0152747 A1* | 8/2003 | Fensel | B32B 5/16 428/143 |
| 2008/0086970 A1* | 4/2008 | Teng | E04D 1/26 52/518 |
| 2008/0118640 A1* | 5/2008 | Kalkanoglu | A01N 25/12 427/186 |
| 2008/0241516 A1* | 10/2008 | Hong | C04B 20/1074 428/331 |
| 2010/0167056 A1 | 7/2010 | Fuss et al. | |
| 2011/0186440 A1* | 8/2011 | Moore | C25D 9/02 205/317 |
| 2013/0004713 A1 | 1/2013 | Zhou | |
| 2013/0017368 A1 | 1/2013 | Zhou | |
| 2013/0295394 A1* | 11/2013 | Hong | C09D 195/00 428/440 |
| 2015/0192698 A1 | 7/2015 | Joedicke et al. | |
| 2018/0058065 A1* | 3/2018 | Jenree | C04B 20/1051 |

\* cited by examiner

Low Magnification – Scale Bars 500 microns

20% ZnO @ 1250

20% feldspar @ 1250

20% ZnO-30% feldspar @ 1250

20% ZnO-30% feldspar @ 1200

Mid Magnification – Scale Bars 100 microns

20% ZnO @ 1250

20% feldspar @ 1250

20% ZnO-30% feldspar @ 1250

20% ZnO-30% feldspar @ 1200

High Magnification – Scale Bars 50 microns

20% ZnO @ 1250

20% feldspar @ 1250

20% ZnO-30% feldspar @ 1250

20% ZnO-30% feldspar @ 1200

SEM-EDS of ZnO-Feldspar @ 1250

MINERAL ROOFING GRANULES AND METHODS FOR MAKING THEM

CROSS-REFERENCE TO RELATED APPLICATIONS

This application claims the benefit of priority of U.S. Provisional Patent Application No. 62/441,199, filed Dec. 31, 2016, and U.S. Provisional Patent Application No. 62/610,991, filed Dec. 28, 2017, each of which is hereby incorporated herein by reference in its entirety.

BACKGROUND OF THE DISCLOSURE

1. Field of the Disclosure

The present disclosure relates generally to roofing products. The present disclosure relates more particularly to roofing granules, such as solar-reflective roofing granules having high stain resistance and algae resistance and/or low amounts of crystalline silica.

2. Technical Background

Sized mineral rocks are commonly used as granules in roofing applications to provide protective functions to the asphalt shingles. Roofing granules are generally used in asphalt shingles or in roofing membranes to protect asphalt from harmful ultraviolet radiation. Roofing granules typically comprise crushed and screened mineral materials, which can be coated subsequently with a binder containing one or more coloring pigments, such as suitable metal oxides. The granules are employed to provide a protective layer on asphaltic roofing materials such as shingles, and to add aesthetic values to a roof.

Depending on location and climate, shingled roofs can experience very challenging environmental conditions, which tend to reduce the effective service life of such roofs. One significant environmental stress is the elevated temperature to which roofing shingles are subjected under sunny, summer conditions.

Mineral-surfaced asphalt shingles, such as those described in ASTM D0225 or D03462, are generally used in steep-sloped roofs to enhance the water-shedding function while adding aesthetically pleasing appearance to the roofs. The asphalt shingles are generally constructed from asphalt-saturated roofing felts and surfaced by pigmented color granules, such as those described in U.S. Pat. No. 4,717,614. Asphalt shingles coated with conventional roofing granules are known to have low solar heat reflectance, and hence will absorb solar heat, especially through the near infrared range (700 nm-2500 nm) of the solar spectrum. This phenomenon is increased as the granules covering the surface become dark in color. For example, while white-colored asphalt shingles can have solar reflectance in the range of 25-35%, dark-colored asphalt shingles can have solar reflectance of only 5-15%. Furthermore, except in the white or very light colors, there is typically only a very small amount of pigment in the color coating of the conventional granules that reflects solar radiation well. As a result, it is common to measure temperatures as high as 77° C. on the surface of black roofing shingles on a sunny day with 21° C. ambient temperature. Absorption of solar heat may result in elevated temperatures at the shingle's surroundings, which can contribute to the so-called "urban heat-island effect" and increase the cooling load to its surroundings. This not only increases the demand for indoor cooling energy, but also contributes to smog formation due to higher surface temperatures. Hence, it is beneficial to have a surface with increased solar reflectance, such as greater than 70 percent, to reduce solar heat gain, thereby reducing the heat flux entering the building envelope or reducing surface temperatures for lowering smog formation. It is therefore advantageous to have roofing shingles that have high solar reflectance.

The surface reflectivity of an asphalt shingle or roofing membrane largely depends on the solar reflectance of the granules that are used to cover the bitumen. Typically, roofing granules are applied such that about 95 to 97 percent of the shingle surface is effectively covered by the granules.

The state of California has implemented a building code requiring the low-sloped roofs to have roof coverings with solar reflectance greater than 70%. However, colored roofing granules, prepared using current coloring technology, are not generally capable of achieving such a high level of solar reflectance. Thus, in order to reduce solar heat absorption, it has been suggested to apply coatings externally directly onto the shingled surface of roofs. White pigment-containing latex coatings have been proposed and evaluated by various manufacturers. However, the polymeric coating applied has only limited amount of service life and requires re-coat after certain years of service. Also, the cost of adding such a coating on roof coverings can be relatively high. Other manufactures have also proposed the use of exterior-grade coatings that were colored by IR-reflective pigments for deep-tone colors and sprayed onto the roof in the field.

Solar control films that contain either a thin layer of metal/metal oxides, or dielectric layers applied through vacuum deposition, have been commercially available for use in architectural glasses.

Many materials have been proposed for use in protecting roofing from solar heat radiation, such as ceramic grog, recycled porcelain, and white plastic chips. However, the previously proposed materials have limited use, and cannot satisfy all requirements for roofing materials. There is a continuing need for roofing materials, and especially asphalt shingles, that have improved resistance to thermal stresses while providing an attractive appearance. In particular, there is a need for roofing granules that provide increased solar heat reflectance to reduce the solar absorption of the shingle. Hence, it would be advantageous to have a granular roofing product that has solar reflectance greater than 70%. It is further advantageous that such a product could be applied to other substrates, such as siding or paving, or can be constructed as part of the system exposed to solar radiation such that the solar heat gain can be reduced to mitigate the urban heat island effect.

SUMMARY OF THE DISCLOSURE

In one aspect, the present disclosure provides a mineral roofing granule having a mineral body and a mineral outer surface, the mineral outer surface having a surface porosity of no more than about 10%, no more than about 5%, no more than about 2%, or even no more than about 1% as measured by mercury porosimetry, the mineral roofing body having at its mineral outer surface a first fired material. In certain such embodiments, the mineral roofing granule having a mineral body and a mineral outer surface, the mineral roofing granule having at its mineral outer surface a first fired material, the first fired material being a first fired mixture comprising an aluminosilicate clay; one or more of a feldspar, a sodium silicate and a nepheline syenite; and a zinc source.

In another aspect, the present disclosure provides a mineral roofing granule having a mineral body and a mineral outer surface, the mineral outer surface, the mineral roofing body having at its mineral outer surface a first fired material, the first fired material being a first fired mixture comprising an aluminosilicate clay, the first fired material having no more than 2 wt % crystalline silica. In certain such embodiments, the mineral roofing granule having a mineral body and a mineral outer surface, the mineral roofing granule having at its mineral outer surface a first fired material, the first fired material being a first fired mixture comprising an aluminosilicate clay; and one or more of a feldspar, a sodium silicate and a nepheline syenite. A zinc source may also be included in the fired mixture.

In another aspect, the present disclosure provides a mineral roofing granule having a mineral body and a mineral outer surface, the mineral roofing granule having at its mineral outer surface a first fired material, the first fired material being a first fired mixture comprising an aluminosilicate clay; one or more of a feldspar, a sodium silicate and a nepheline syenite; and, optionally, a zinc source.

In another aspect, the present disclosure provides a method for making a mineral roofing granule as described herein, the method including providing a green granule having at its outer surface a first mixture comprising an aluminosilicate clay, and firing the green granule to provide the mineral roofing granule, the firing converting the first mixture to the first fired material.

In another aspect, the present disclosure provides a mineral roofing granule made by any method as described herein.

In another aspect, the present disclosure provides a collection of the mineral roofing granules as described herein.

In another aspect, the present disclosure provides a roofing membrane or shingle including a collection of mineral roofing granules as described herein embedded in a bituminous surface of the roofing membrane or shingle.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The present inventors have determined that, while it can be highly desirable for a mineral roofing granule to have some degree of porosity within its interior, for example, to increase the solar reflectance value, porosity at the surface of the mineral roofing granule can be undesirable from the standpoint of stain resistance. Specifically, while solar reflective mineral roofing granules can themselves be made with high reflectivity, conventional solar roofing granules can experience a reduction (or a "drop") in solar reflectance when applied to a bituminous roofing substrate. The bituminous material of such a substrate is typically in a softened state when solar reflective mineral roofing granules are applied thereto. Without intending to be bound by theory, the inventors believe that sufficiently liquid components of the black-colored bituminous material can be pulled by capillary action into pores on the outer surface of mineral roofing granules, causing the drop in solar reflectance values. As explained in detail below, the present inventors have provided mineral roofing granules having low porosity at their outer surfaces, and thus an improved stain resistance, while retaining a high degree of solar reflectivity.

The present inventors have also noted that crystalline silica phases, such as quartz and cristobalite, can present a significant health and safety issue in granule materials. As explained in detail below, the present inventors have provided mineral roofing granules that can have relatively low amounts of crystalline silica, or, even, no crystalline silica (as detected by XRD), while still providing acceptable solar reflectivity and crush strength values.

Figure 1:
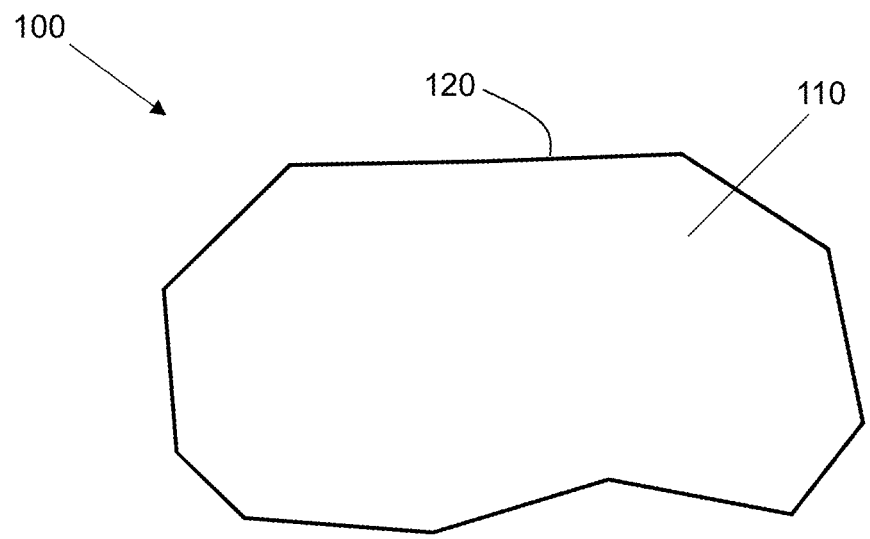
FIG. 1 is a schematic cross-sectional view of a mineral roofing granule according to one embodiment of the disclosure.

One aspect of the disclosure is shown in schematic cross-sectional view in FIG. 1. Mineral roofing granule 100 has a mineral body 110 and a mineral outer surface 120. The mineral roofing body having at its mineral outer surface a first fired material. As will be described in more detail below, in some embodiments this is substantially the same as the material of the entire body of the granule. In other embodiments, the mineral body can be of multiple materials, with the first fired material at the mineral outer surface of the mineral roofing granule.

As used herein, a fired material is a material that is the result of firing a fireable mixture. The fireable mixtures described herein generally include an aluminosilicate clay, in various embodiments, in combination with one or more additives selected from a zinc source, a feldspar, nepheline syenite and sodium silicate. As the person of ordinary skill in the art will appreciate, firing is the heating of a material to an elevated temperature. Firing of the mixtures described herein can cause both calcination and densification to result in a fired material that is different in density and/or composition from the fireable mixture. In typical embodiments, some degree of both calcination and densification (e.g., through sintering) occurs during the firing process.

Notably, in certain embodiments of the granules as otherwise described herein, the mineral outer surface of the mineral roofing granules has a surface porosity of no more than about 10% as measured by mercury porosimetry. For example, in certain embodiments of the mineral roofing granules as otherwise described herein, the mineral outer surface of the mineral roofing granules has a surface porosity of no more than about 5% as measured by mercury porosimetry. In other embodiments of the mineral outer surface of the mineral roofing granules has a surface porosity of no more than about 3% as measured by mercury porosimetry. In other embodiments of the mineral outer surface of the mineral roofing granules has a surface porosity of no more than about 2% as measured by mercury porosimetry. In other embodiments of the mineral outer surface of the mineral roofing granules has a surface porosity of no more than about 1% as measured by mercury porosimetry. As described above, the present inventors have determined that a low surface porosity can provide for increased resistance to long-term staining, e.g., a reduced "drop" in solar reflectance when applied to a heated bituminous roofing substrate. The person of ordinary skill in the art will, based on the description herein, select firable mixtures, granulation methods and firing conditions that provide a desirably low porosity. High-shear mixing can advantageously be used to form granules having relatively low porosity.

Notably, in certain embodiments of the granules as otherwise described herein, the first fired material has no more than 2 wt % crystalline silica. In certain such embodiments, the first fired material has no more than 1 wt %, no more than 0.5 wt %, or even no more than 0.1 wt % crystalline silica. As described above, the inventors have provided strong, solar-reflective granules that have desirably low amounts of crystalline silica, even when the aluminosilicate clay of the first fired mixture includes a kaolin clay. Crystalline silica is associated with undesirable health effects, and thus provision of granules with low amounts of crystalline silica are especially advantageous. The person of ordinary skill in the art will, based on the description herein, select firable mixtures, granulation methods and firing conditions that provide a desirably low amount of crystalline silica in the first fired material. The use of nepheline syenite (e.g., in the substantial absence of feldspar and sodium silicate) can provide materials with relatively low amounts of crystalline silica.

In certain embodiments of the mineral roofing granules as otherwise described herein, the first fired material is a first fired mixture comprising an aluminosilicate clay. As used herein, a "fired mixture" is defined by the components of the mixture that is fired to form a "fired material." The fired mixture is defined on dry basis, i.e., exclusive of any water or solvent that is used to provide the fired mixture with formability. Aluminosilicate clays can be used to make highly solar-reflective mineral roofing granules.

In certain embodiments of the mineral roofing granules as otherwise described herein, the first fired mixture further includes a feldspar, nepheline syenite, and/or a sodium silicate. Materials such as feldspars, nepheline syenite and sodium silicates can increase the flowability of a clay material by lowering of the melting point of the material and thus promoting liquefaction at a given firing temperature, and as such can allow for a decreased porosity.

In certain embodiments of the mineral roofing granules as otherwise described herein, the first fired mixture further includes a zinc source. As the person of ordinary skill in the art will appreciate, the zinc source can be converted in the firing to zinc compounds such as zinc oxide, zinc silicates, zinc aluminosilicates and zinc aluminates. As described in further detail below, the use of a zinc source can not only provide algae resistance to the mineral roofing granule, but can also provide a decreased porosity at the mineral outer surface of the mineral roofing granule, especially when used in combination with a feldspar, a sodium silicate and/or a nepheline syenite.

Accordingly, another aspect of the disclosure is a mineral roofing granule having a mineral body and a mineral outer surface, as described above with reference to FIG. 1. The mineral roofing granule has at its mineral outer surface (120 in FIG. 1) a first fired material. The first fired material is a first fired mixture comprising an aluminosilicate clay; one or more of a feldspar, a sodium silicate and nepheline syenite; and, optionally, a zinc source. A wide variety of suitable firable mixtures are described herein. In certain such mineral roofing granules as otherwise described herein, the mineral outer surface has, for example, a surface porosity of no more than about 10%, no more than about 5%, no more than about 3%, no more than about 2%, or even no more than about 1%, as measured by mercury porosimetry. And in certain such embodiments, as otherwise described herein, the first fired material has no more than 2 wt %, no more than 1 wt %, no more than 0.5%, or even no more than 0.1 wt % crystalline silica.

In certain embodiments of the mineral roofing granules as otherwise described herein, the aluminosilicate clay of the first fired mixture is a kaolin clay. As the person of ordinary skill in the art will appreciate, a "kaolin clay" or "kaolin" is a material comprising kaolinite, quartz and feldspar. For use in the mineral roofing granules as described herein, it is desirable that the kaolin have a kaolinite content of at least about 80 weight percent, for example, at least about 90 weight percent, or even at least about 95 weight percent. As used herein, the amount of any feldspar, nepheline syenite and sodium silicate present in the kaolin (or other aluminosilicate clay) of a mixture to be fired is calculated as part of the kaolin (or other aluminosilicate clay) component, and not part of the feldspar, nepheline syenite or sodium silicate component.

The person of ordinary skill in the art will appreciate that a variety of types or grades of kaolin can be used. The kaolin used in the mineral roofing granules described herein can be (or can include), for example, a kaolin crude material, including kaolin particles, oversize material, and ferruginous and/or titaniferous and/or other impurities, having particles ranging in size from submicron to greater than 20 micrometers in size. Alternatively, in certain desirable embodiments, a refined grade of kaolin clay can be employed, such as, for example, a grade of kaolin clay including mechanically delaminated kaolin particles. Further, grades of kaolin such as those coarse grades used to extend and fill paper pulp and those refined grades used to coat paper can be employed in the mineral roofing granules as described herein. Examples of kaolins suitable for use in the mineral roofing granules as described herein include, for example, EPK Kaolin (Edgar Materials), for example in jet-milled form; Kaobrite 90 (Thiele Kaolin); and SA-1 Kaolin (Active Minerals). Kaolins can be subjected to any of a number of conventional processes to beneficiate them, e.g., blunging, degritting, classifying, magnetically separating, flocculating, filtrating, redispersing, spray drying, pulverizing and firing.

In certain embodiments of the roofing granules as otherwise described herein, a different aluminosilicate clay can be used in combination with or instead of the kaolin. For example, in certain embodiments of the roofing granules as otherwise described herein, the aluminosilicate clay is (or includes) bauxite. In certain embodiments of the roofing granules as otherwise described herein, the aluminosilicate clay is (or includes) chamotte. In certain embodiments of the roofing granules as otherwise described herein, the aluminosilicate clay is (or includes) a white clay such as ball clay or montmorillonite. In certain embodiments of the roofing granules as otherwise described herein, the aluminosilicate clay is (or includes) a white clay such as ball clay or montmorillonite. However, in certain desirable embodiments, at least 50 wt %, e.g., at least 70 wt %, at least 80 wt %, at least 90 wt %, or even at least 95 wt % of the aluminosilicate clay is kaolin.

The person of ordinary skill in the art will, on the basis of the description provided herein, select aluminosilicate clay(s) that provide a high degree of whiteness, and thus a high degree of solar reflectance. Two important impurities in aluminosilicate clays such as kaolin are iron and titanium. Iron can create highly-colored impurities, especially upon firing and especially when present in combination with titanium. Accordingly, in certain desirable embodiments of the mineral roofing granules as otherwise described herein, the aluminosilicate clay of the first fired mixture has no more than 1 wt % iron, e.g. no more than 0.7 wt % or no more than 0.5 wt % iron, as measured by inductively-coupled plasma mass spectrometry (ICP-MS) and reported as $Fe_2O_3$. Similarly, in certain desirable embodiments of the mineral roofing granules as otherwise described herein, the aluminosilicate clay of the first fired mixture has no more than 1 wt % titanium, e.g., no more than 0.7 wt % no more than 0.5 wt % titanium, measured by ICP-MS and reported as $TiO_2$. The person of ordinary skill in the art can select suitable clays having low amounts of iron and titanium.

In certain embodiments of the mineral roofing granules as otherwise described herein, the aluminosilicate clay is present in the first fired mixture in an amount in the range of 40-90 wt % (i.e., exclusive of water or any solvent used to moisten the mixture for formability). For example, in various embodiments of the mineral roofing granules as otherwise described herein, the aluminosilicate clay is present in the first fired mixture in an amount in the range of 40-80 wt %, or 40-70 wt %, or 40-60 wt %, or 50-90 wt %, or 50-80 wt %, or 50-70 wt %, or 60-90 wt %, or 60-80 wt %, or 70-90 wt %. The person of ordinary skill in the art will, based on the disclosure herein, select an amount of aluminosilicate clay, e.g., in combination with other components, that provides the desired solar reflectance and stain resistance to the mineral roofing granules.

In certain embodiments of the mineral roofing granules as otherwise described herein, the first fired mixture includes a feldspar. As noted above, the feldspar of the first fired mixture is a component separate from any kaolin or other aluminosilicate clay present, and thus the feldspar component is not said to include any feldspar present in the kaolin or other aluminosilicate clay. As noted above, the use of feldspar can lower the effective sintering temperature of the overall first fired mixture, and as such can provide for a lower degree of surface porosity at a given firing temperature. As the person of ordinary skill in the art will appreciate, feldspars are aluminosilicates of sodium, potassium, calcium and/or barium. Most commonly, the feldspars are considered as solid solutions of three limiting compounds, soda feldspar, potash feldspar and lime feldspar. Accordingly, in certain embodiments of the mineral roofing granules as otherwise described herein, the feldspar is one or more of a soda feldspar, a potash feldspar, and a lime feldspar. For example, in certain embodiments of the mineral roofing granules as otherwise described herein, the feldspar is (or includes) a soda feldspar. In certain embodiments of the mineral roofing granules as otherwise described herein, the feldspar is (or includes) a potash feldspar. In certain embodiments of the mineral roofing granules as otherwise described herein, the feldspar is (or includes) a lime feldspar. MINSPAR™ 4 (Imerys) is an example of a suitable feldspar for use in the mineral roofing granules described herein. The person of ordinary skill in the art will appreciate that other feldspars, such as plagioclase (solid solution between albite and anorthite), alkali feldspars (solid solutions between K-feldspar and albite) and barium feldspars can be suitable for use in the preparation of the mineral granules as otherwise described herein.

The person of ordinary skill in the art will, based on the disclosure herein, select an amount of a feldspar, in combination with the other component(s), that provides the desired solar reflectance and stain resistance to the mineral roofing granules. For example, in certain embodiments of the mineral roofing granules as otherwise described herein, the feldspar is present in the first fired mixture in an amount in the range of 2-40 wt % (i.e., exclusive of water or any solvent used to moisten the mixture for formability). In various embodiments of the mineral roofing granules as otherwise described herein, the feldspar is present in the first fired mixture in an amount in the range of 2-30 wt %, or 2-25 wt %, or 2-20 wt %, or 2-15 wt %, or 2-15 wt %, or 5-40 wt %, or 5-30 wt %, or 5-25 wt %, or 5-20 wt %, or 5-15 wt %, or 10-40 wt %, or 10-30 wt %, or 10-25 wt %, or 10-20 wt %, or 15-40 wt %, or 15-30 wt %, or 15-25 wt %, or 20-40 wt %, or 20-35 wt %, or 20-30 wt %.

However, in other embodiments of the mineral roofing granules as otherwise described herein, the first fired mixture does not include a substantial amount of feldspar (i.e., separate from any feldspar in nepheline syenite that is present). For example, in certain embodiments, the first fired mixture includes less than 1 wt %, less than 0.5 wt %, or even less than 0.2 wt % feldspar.

In certain embodiments of the mineral roofing granules as otherwise described herein, the first fired mixture includes a sodium silicate (e.g., in combination with, or instead of the feldspar). Like the feldspar, the sodium silicate of the first fired mixture is a component separate from any kaolin or other aluminosilicate clay present, and thus the sodium silicate component is not said to include any sodium silicate present in the kaolin or other aluminosilicate clay. As noted above, the use of sodium silicate can lower the effective sintering temperature of the overall first fired mixture, and as such can provide for a lower degree of surface porosity at a given firing temperature.

The person of ordinary skill in the art will, based on the disclosure herein, select an amount of a sodium silicate, in combination with the other component(s), that provides the desired solar reflectance, stain resistance and low crystalline silica content to the mineral roofing granules. For example, in certain embodiments of the mineral roofing granules as otherwise described herein, the sodium silicate is present in the first fired mixture in an amount in the range of 5-40 wt % (i.e., exclusive of water or any solvent used to moisten the mixture for formability). In various embodiments of the mineral roofing granules as otherwise described herein, the sodium silicate is present in the first fired mixture in an amount in the range of 5-30 wt %, or 5-25 wt %, or 5-20 wt %, or 5-15 wt %, or 10-40 wt %, or 10-30 wt %, or 10-25 wt %, or 10-20 wt %, or 15-40 wt %, or 15-30 wt %, or 15-25 wt %, or 20-40 wt %, or 20-35 wt %, or 20-30 wt %. Of course, in other embodiments, substantially no separate sodium silicate component (i.e., separate from the feldspar and/or nepheline syenite) is present in the first fired mixture. For example, in certain embodiments, the first fired mixture includes less than 1 wt %, less than 0.5 wt %, or even less than 0.2 wt % sodium silicate.

The person of ordinary skill in the art will, based on the disclosure herein, select an amount of a nepheline syenite, in combination with the other component(s), that provides the desired solar reflectance and low crystalline content to the mineral roofing granules. For example, in certain embodiments of the mineral roofing granules as otherwise described herein, the nepheline syenite is present in the first fired mixture in an amount in the range of 2-40 wt % (i.e., exclusive of water or any solvent used to moisten the mixture for formability). In various embodiments of the mineral roofing granules as otherwise described herein, the nepheline syenite is present in the first fired mixture in an amount in the range of 2-30 wt %, or 2-25 wt %, or 2-20 wt %, or 2-15 wt %, or 2-15 wt %, or 5-40 wt %, or 5-30 wt %, or 5-25 wt %, or 5-20 wt %, or 5-15 wt %, or 10-40 wt %, or 10-30 wt %, or 10-25 wt %, or 10-20 wt %, or 15-40 wt %, or 15-30 wt %, or 15-25 wt %, or 20-40 wt %, or 20-35 wt %, or 20-30 wt %. In certain embodiments, when the first fired mixture includes the nepheline syenite, it does not include a substantial amount of feldspar. And in certain embodiments, when the first fired mixture includes the nepheline syenite, it does not include a substantial amount of sodium silicate.

However, in other embodiments of the mineral roofing granules as otherwise described herein, the first fired mixture does not include a substantial amount of nepheline syenite. For example, in certain embodiments, the first fired mixture includes less than 1 wt %, less than 0.5 wt %, or even less than 0.2 wt % nepheline syenite.

In certain embodiments of the mineral roofing granules as otherwise described herein, the first fired mixture includes a zinc source. As the person of ordinary skill in the art will appreciate, the zinc source can be substantially any zinc compound that, when fired together with an aluminosilicate source provides inorganic zinc, e.g., in the form of one or more of a zinc oxide, a zinc silicate, a zinc aluminosilicate and a zinc aluminate. For example, in certain embodiments of the mineral roofing granules as otherwise described herein, the zinc source is (or includes) zinc oxide. In certain embodiments of the mineral roofing granules as otherwise described herein, the zinc source is (or includes) one or more of zinc oxide, zinc sulfide, zinc sulfate, zinc borate, a zinc silicate, a zinc aluminate, or a zinc aluminosilicate. Advantageously, the inventors have surprisingly found that the use of a zinc source can surprisingly provide a lower porosity to a fired material at a given firing temperature, especially when used in combination with a feldspar, a nepheline syenite and/or a sodium silicate. The use of a zinc source can also provide a mineral roofing granule with algae resistance, and can also provide increased whiteness to the fired material overall.

The person of ordinary skill in the art will, based on the disclosure herein, select an amount of a zinc source, in combination with the other component(s), that provides the desired solar reflectance and stain resistance to the mineral roofing granules. For example, in certain embodiments of the mineral roofing granules as otherwise described herein, the zinc source is present in the first fired mixture in an amount in the range of 1-30 wt % (i.e., exclusive of water or any solvent used to moisten the mixture for formability). In various embodiments of the mineral roofing granules as otherwise described herein, the sodium silicate is present in the first fired mixture in an amount in the range of 1-25 wt %, or 1-20 wt %, or 1-15 wt %, or 5-30 wt %, or 5-25 wt %, or 5-20 wt %, or 15-30 wt %, or 10-25 wt %, or 15-30 wt %. The zinc source can be provided in a variety of particle sizes. In certain embodiments, the particle size (median) of the zinc source (e.g., ZnO) can be in the range of 50-500 nm, e.g., 100-500 nm, 50-250 nm, or 100-200 nm.

Figure 10:
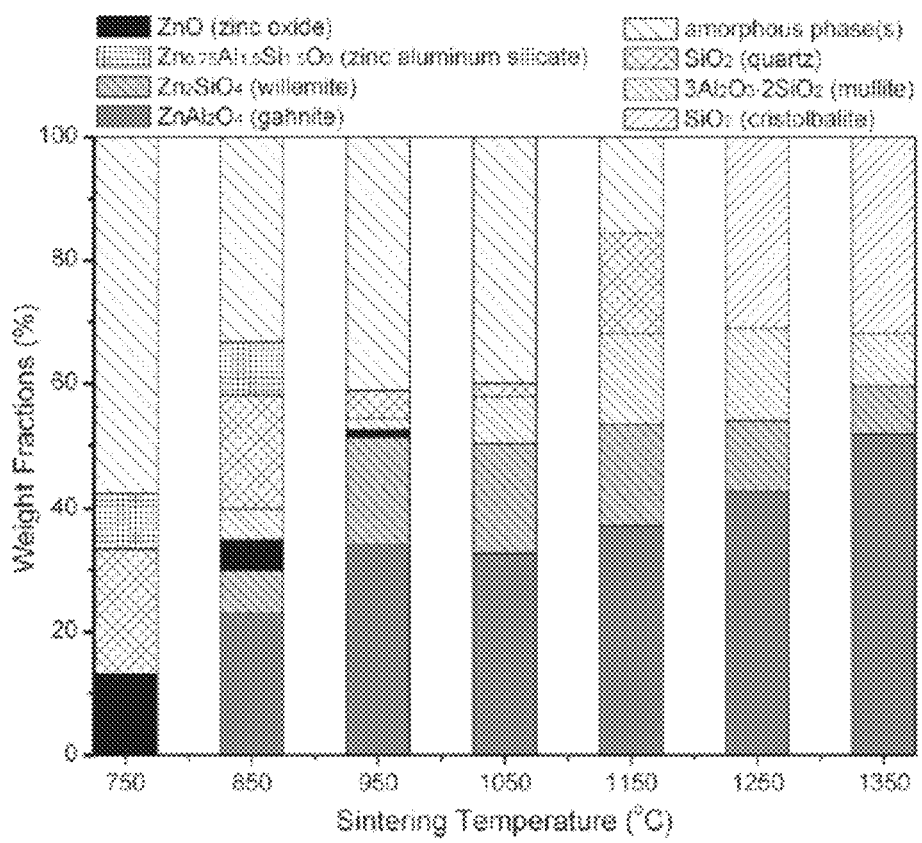
FIG. 10 is a graph of zinc oxide, silicate, aluminosilicate and aluminate phases as a function of firing temperature.

The zinc source can in some cases be transformed during firing to one or more different zinc compounds. The person of ordinary skill in the art will appreciate that the zinc makeup of the first fired material will depend on, e.g., the particular composition of the zinc source used, the firing conditions (e.g., time and temperature), and the particular composition(s) of the other component(s) of the first fired mixture. In certain embodiments of the mineral roofing granules as otherwise described herein, at least 50% (e.g., at least 60%, at least 70%) of the zinc present in the first fired material is present as a zinc oxide or a zinc silicate, as determined by X-ray crystallography. In other embodiments of the mineral roofing granules as otherwise described herein, at least 50% (e.g., at least 60%, at least 70%) of the zinc present in the first fired material is present as a zinc oxide, a zinc aluminate, a zinc aluminosilicate or a zinc silicate, as determined by X-ray crystallography. And in certain desirable embodiments of the roofing granules as otherwise described herein, no more than 40% (e.g., no more than 30%, no more than 20%) of the zinc present in the first fired material is present as $ZnAl_2O_4$, as determined by X-ray crystallography. The present inventors have noted that $ZnAl_2O_4$ is much less leachable at acidic pH than other commonly-used forms of zinc (e.g., ZnO and Zn silicate). The present inventors have determined that through selection of components in the mixtures to be fired and of firing temperatures based on the disclosure herein, the person of ordinary skill in the art can provide a desired balance of $ZnAl_2O_4$ as compared to other zinc forms, and thereby provide a desired overall rate of leaching. As demonstrated by Y. Tang et al., Environmental Technology, 36: 23, 2977-2986 (2015), $ZnAl_2O_4$ tends to form at higher firing temperatures. FIG. 10 is a graph showing the different phases of zinc compounds detected when ZnO and a kaolinite precursor (Zn:Al 1:2 mole:mole) were fired at various temperatures. The present inventors have thus determined that use of a feldspar, a nepheline syenite, or a sodium silicate together with a zinc source can be unexpectedly advantaged in that it can allow for firing at lower temperatures to provide a given level of porosity and solar reflectance, and allow the person of ordinary skill in the art to provide material with a desirable relative amounts of $ZnAl_2O_4$ with respect to other zinc forms in an as-fired material. The person of ordinary skill in the art will, based on the description herein, select amounts of feldspar, nepheline syenite and/or sodium silicate, amounts of zinc source and firing conditions to provide the desired algae resistance in combination with a desired solar reflectance, a desired level of crystalline silica, and a desired stain resistance.

In certain embodiments of the mineral roofing granules as otherwise described herein, the first fired material is a fired aluminosilicate material including in the range of 1-30 wt % zinc, measured on a zinc oxide basis (i.e., assuming that all zinc is in the form of ZnO). In certain such embodiments, the zinc is present in the first fired material in an amount in the range of 1-25 wt %, or 1-20 wt %, or 1-15 wt %, or 5-30 wt %, or 5-25 wt %, or 5-20 wt %, or 10-30 wt %, or 10-25 wt %, or 10-30 wt %. The person of ordinary skill in the art will appreciate that the first fired material can include a number of different crystalline phases. However, in certain desirable embodiments, the first fired material includes less than 10 wt %, less than 5 wt %, less than 2 wt %, or even less than 1 wt % cristobalite. The inventors have noted that the use of feldspar, nepheline syenite and/or sodium silicate as described herein can allow for relatively low firing temperatures, below the temperature at which significant amounts of crystalline silica phases (especially cristobalite and quartz) can form. And, critically, the inventors have determined that even at high firing temperatures, mixtures including nepheline syenite can provide very low amounts of crystalline silica. This can allow for relatively high firing temperatures to be used to provide a low surface porosity, without creating an undesirably high amount of crystalline silica.

The first fired material has been described above with respect to its position at the mineral outer surface of a roofing granule. The first fired material can be present, for example, through at least a depth of 50 microns of the mineral roofing granule. In certain embodiments, the first fired material is present through at least a depth of 100 microns, or even 200 microns of the mineral roofing granule.

In certain embodiments of the mineral roofing granules as otherwise described herein, the composition of the mineral body of the mineral roofing granule is substantially homogeneous throughout. That is, the mineral body, extending substantially to the mineral outer surface, has a substantially homogeneous composition. This does not, however, mean that there is no phase or material separation within the mineral body. Rather, "substantially homogeneous" is used here to signify that there is no large-scale region (e.g., having a diameter of 200 microns) of the mineral body that is different in overall composition from another large-scale region (e.g., having a diameter of 200 microns) of the mineral body.

In certain embodiments of the mineral roofing granules as otherwise described herein, the porosity of the mineral body is substantially homogeneous throughout. That is, the mineral body, extending substantially to the mineral outer surface, has a substantially homogeneous porosity.

However, in other embodiments of the mineral roofing granules as otherwise described herein, the porosity of the mineral body is substantially higher than the porosity at the mineral outer surface. For example, without intending to be bound by theory, the inventors surmise that in some cases the feldspar, nepheline syenite and/or sodium silicate can migrate to the particle surface, providing a higher degree of densification and therefore a lower porosity than in the rest of the mineral roofing granule even in a mineral roofing granule made from a single fired mixture. And in some embodiments, multiple fired mixtures can be used to make the mineral roofing granules, with a higher amount of one or more of the zinc source, feldspar, nepheline syenite and/or sodium silicate in the mixture used at the mineral outer surface of the mineral roofing granule. This, too, can lead to increased densification and therefore lower porosity at the surface. A higher degree of porosity in the mineral body can help to improve solar reflectance of the mineral roofing granule.

The mineral roofing granules described herein can have a variety of densities. For example, certain embodiments of the mineral roofing granules as otherwise described herein have a density in the range of about 2.25 g/mL about 3.25 g/mL. For example, in certain embodiments, the density is about 2.5 g/mL to about 3 g/mL, or about 2.25 g/mL to about 3 g/mL, or about 2.5 g/mL to about 3.25 g/mL. Lower density granules are not only advantageously lighter, they can also have higher internal porosity (i.e., for a given particle size and porosity at an outer mineral surface), and thus can have a desirably higher solar reflectance.

Figure 2:
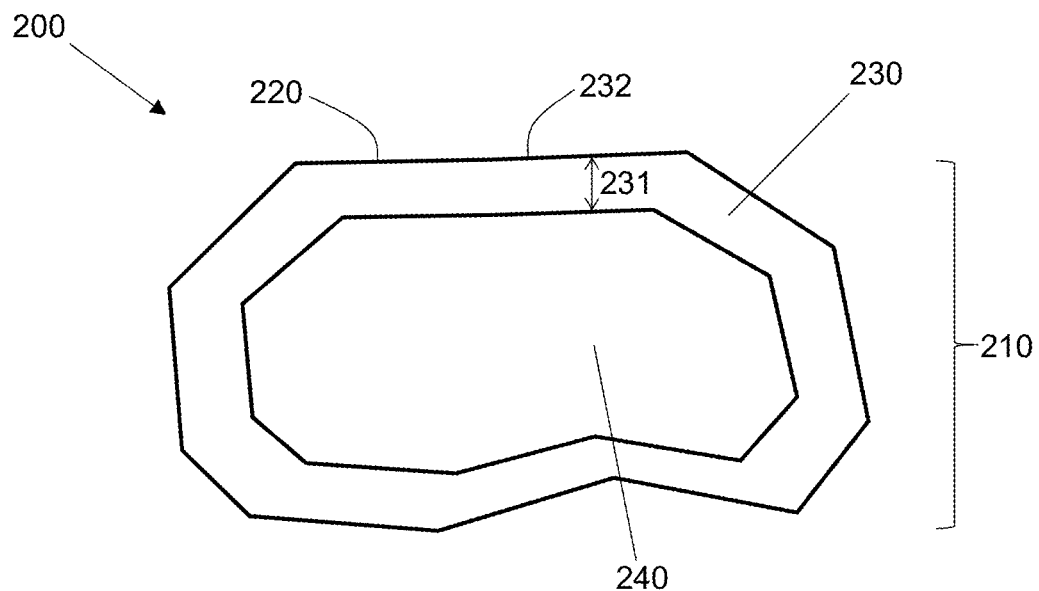
FIG. 2 is a schematic cross-sectional view of a mineral roofing granule according to another embodiment of the disclosure.

In certain embodiments of the disclosure, a mineral roofing granule as otherwise described herein includes a mineral shell disposed about a mineral core, with the outer surface of the mineral shell being the mineral outer surface of the mineral roofing granule, the mineral shell being of the first fired material. That is, the first fired material as described herein can be used to surround a mineral core made of a different material. Such an embodiment is shown in schematic cross-sectional view in FIG. 2. Mineral roofing granule 200 has a mineral body 210 and a mineral outer surface, with a low porosity at the mineral outer surface of the particle 220. The mineral roofing granule includes a mineral shell 230, with an average thickness denoted by reference numeral 231, and an outer surface 232. The mineral shell 230 is disposed about a mineral core 240. The mineral shell 230 is of the first fired material above, and its outer surface 232 is the mineral outer surface 220 of the mineral roofing granule.

In certain desirable embodiments of the core-shell mineral roofing granules as otherwise described herein, the mineral shell has a substantially lower porosity than the mineral core. The use of a relatively higher porosity mineral core can provide an overall higher solar reflectance to the mineral roofing granule, with the lower porosity mineral shell providing stain resistance. For example, in certain embodiments of the mineral roofing granules as otherwise disclosed herein, the porosity of the mineral core is at least twice, at least five times, or even at least ten times the porosity of the mineral shell. Porosity in these comparisons can be measured as a percentage of volume that is not occupied by material.

In certain embodiments of the core-shell mineral roofing granules as otherwise described herein, the mineral core includes one or more of a second fired material and a base mineral particle. Such granules can be made, for example, by building the core and the shell in subsequent steps from two different mixtures to be fired, e.g., in two granulation steps or two compaction steps. The manufacture of such mineral roofing granules will be described in more detail below.

For example, in certain such embodiments, the mineral core is of a second fired material, the second fired material can be a second fired mixture including an aluminosilicate clay. The aluminosilicate clays described above with respect to the first fired mixture can be used in the second fired material. For example, in certain embodiments, the aluminosilicate clay of the second fired mixture is (or includes) a kaolin. In certain embodiments, of the mineral roofing granules as otherwise described herein, the aluminosilicate clay of the second fired mixture is (or includes) bauxite. In certain embodiments of the mineral roofing granules as otherwise described herein, the aluminosilicate clay of the second fired mixture is (or includes) chamotte. In certain embodiments of the roofing granules as otherwise described herein, the aluminosilicate clay of the second fired mixture is (or includes) a white clay such as ball clay or montmorillonite. In certain embodiments of the roofing granules as otherwise described herein, the aluminosilicate clay is (or includes) a white clay such as ball clay or montmorillonite. However, in certain desirable embodiments, at least 50 wt %, e.g., at least 70 wt %, at least 80 wt %, at least 90 wt %, or even at least 95 wt % of the aluminosilicate clay of the second fired mixture is kaolin. In certain desirable embodiments, the aluminosilicate clay of the second fired mixture has no more than 1 wt % iron, e.g., no more than 0.7 wt % no more than 0.5 wt % iron, measured by ICP-MS and reported as $Fe_2O_3$. In certain desirable embodiments, the aluminosilicate clay of the second fired mixture has no more than 1 wt % titanium, e.g., no more than 0.7 wt % no more than 0.5 wt % titanium, measured by ICP-MS and reported as $TiO_2$.

In certain embodiments of the mineral roofing granules as otherwise described herein, the aluminosilicate clay is present in the second fired mixture in an amount of at least 40 wt % (i.e., exclusive of water or any solvent used to moisten the mixture for formability). For example, in various embodiments of the mineral roofing granules as otherwise described herein, the aluminosilicate clay is present in the first fired mixture in an amount in the range of at least 50%, or at least 60%, or at least 70%, or at least 80%, or 40-98%, or 50-98%, or 60-98%, or 70-98%, or 80-98%, or 40-95%, or 50-95%, or 60-95%, or 70-95%, or 80-95%.

In certain embodiments of the mineral roofing granules as otherwise described herein, the second fired mixture further includes a feldspar. Any of the feldspars described above with respect to the first fired mixture can be used in the second fired mixture, e.g., a soda feldspar, a potash feldspar and/or a lime feldspar. The feldspar can be present, for example, in an amount up to 30%, e.g., up to 20%, or up to 15%, or up to 10%, or 2-30%, or 5-30%, or 2-20%, or 5-20%, or 2-15%, or 5-15%, or 2-10%. The person of ordinary skill in the art will, on the basis of the present disclosure, provide an amount of feldspar in the second fired mixture that provides for a second fired material providing a desired set of physical properties (e.g., porosity, crush strength, solar reflectance). When the second fired mixture is fired under the same firing conditions as the first fired material, the person of ordinary skill in the art can, based on the disclosure herein, provide an amount of feldspar that yields the desired mineral core properties under those firing conditions. For example, in certain embodiments, the amount of feldspar present in the second fired mixture is substantially less than the amount of feldspar present in the second fired mixture, e.g., used at a rate that is at least 2 percentage points, at least 5 percentage points, or even at least 10 percentage points different than in the first fired mixture. In certain embodiments, however, the second fired mixture does not substantially include a feldspar.

In certain embodiments of the mineral roofing granules as otherwise described herein, the second fired mixture further includes a sodium silicate. The sodium silicate can be present, for example, in an amount up to 30%, e.g., up to 20%, or up to 15%, or up to 10%, or 2-30%, or 5-30%, or 2-20%, or 5-20%, or 2-15%, or 5-15%, or 2-10%. The person of ordinary skill in the art will, on the basis of the present disclosure, provide an amount of sodium silicate in the second fired mixture that provides for a second fired material providing a desired set of physical properties (e.g., porosity, crush strength, solar reflectance). When the second fired mixture is fired under the same firing conditions as the first fired material, the person of ordinary skill in the art can, based on the disclosure herein, provide an amount of sodium silicate that yields the desired mineral core properties under those firing conditions. For example, in certain embodiments, the amount of sodium silicate present in the second fired mixture is substantially less than the amount of sodium silicate present in the second fired mixture, e.g., used at a rate that is at least 2 percentage points, at least 5 percentage points, or even at least 10 percentage points different than in the first fired mixture. In certain embodiments, however, the second fired mixture does not substantially include a sodium silicate.

In certain embodiments of the mineral roofing granules as otherwise described herein, the second fired mixture further includes a nepheline syenite. The nepheline syenite can be present, for example, in an amount up to 40%, e.g., up to 30%, up to 20%, or up to 15%, or up to 10%, or 2-40%, or 2-30%, or 5-30%, or 2-20%, or 5-20%, or 2-15%, or 5-15%, or 2-10%, or 10-40%, or 10-30%. The person of ordinary skill in the art will, on the basis of the present disclosure, provide an amount of nepheline syenite in the second fired mixture that provides for a second fired material providing a desired set of physical properties (e.g., porosity, crush strength, solar reflectance). When the second fired mixture is fired under the same firing conditions as the first fired material, the person of ordinary skill in the art can, based on the disclosure herein, provide an amount of nepheline syenite that yields the desired mineral core properties under those firing conditions. For example, in certain embodiments, the amount of nepheline syenite present in the second fired mixture is substantially less than the amount of nepheline syenite present in the second fired mixture, e.g., used at a rate that is at least 2 percentage points, at least 5 percentage points, or even at least 10 percentage points different than in the first fired mixture. In certain embodiments in which nepheline syenite is present in the second fired mixture, substantially no feldspar and substantially no sodium silicate is present in the second fired mixture. In certain embodiments, however, the second fired mixture does not substantially include a nepheline syenite.

In certain embodiments of the mineral roofing granules as otherwise described herein, the second fired mixture can include a zinc source. Any of the zinc sources described above with respect to the first fired mixture can be used in the second fired mixture. And as low porosity is not as desirable in the mineral core, other zinc sources can be used. For example, in certain embodiments, the zinc source of the second fired material is a zinc oxide, or is one or more of zinc oxide, zinc sulfide, zinc sulfate, zinc carbonate, zinc pyrithione, zinc ricinoleate, zinc stearate and zinc borate. However, as the zinc in the mineral core is relatively less accessible for leaching to the mineral outer surface of the mineral roofing granule for algae resistance, and as the mineral core may be desired to have a somewhat higher porosity, in some embodiments it may not be necessary to use large amounts of zinc in the mineral core. However, zinc can lower the necessary firing temperature for the mineral core, and can further act as a whitening agent, so it may be desirable to include some zinc in the mineral core. For example, in certain embodiments, a zinc source is present in the second fired mixture in an amount of up to 20%, or up to 10%, e.g., 1-20% or 1-10%. However, in other embodiments, the second fired mixture does not substantially include a zinc source.

In other embodiments of the mineral roofing granules as otherwise described herein, the mineral core is a base mineral particle. A base mineral particle will typically have a higher density and lower whiteness than a second fired material as described above. But if the first fired material is sufficiently solar reflective, use of a base mineral particle can decrease cost and process complexity. For example, the base mineral particle can be a suitably-sized particle of a naturally occurring material such as talc, slag, granite, silica sand, greenstone, andesite, porphyry, marble, syenite, rhyolite, diabase, greystone, quartz, slate, trap rock, basalt, and marine shell. Recycled manufactured materials can also be used as a base mineral particle, e.g., recycled manufactured materials such as crushed bricks, concrete, porcelain and fire clay.

Figure 3:
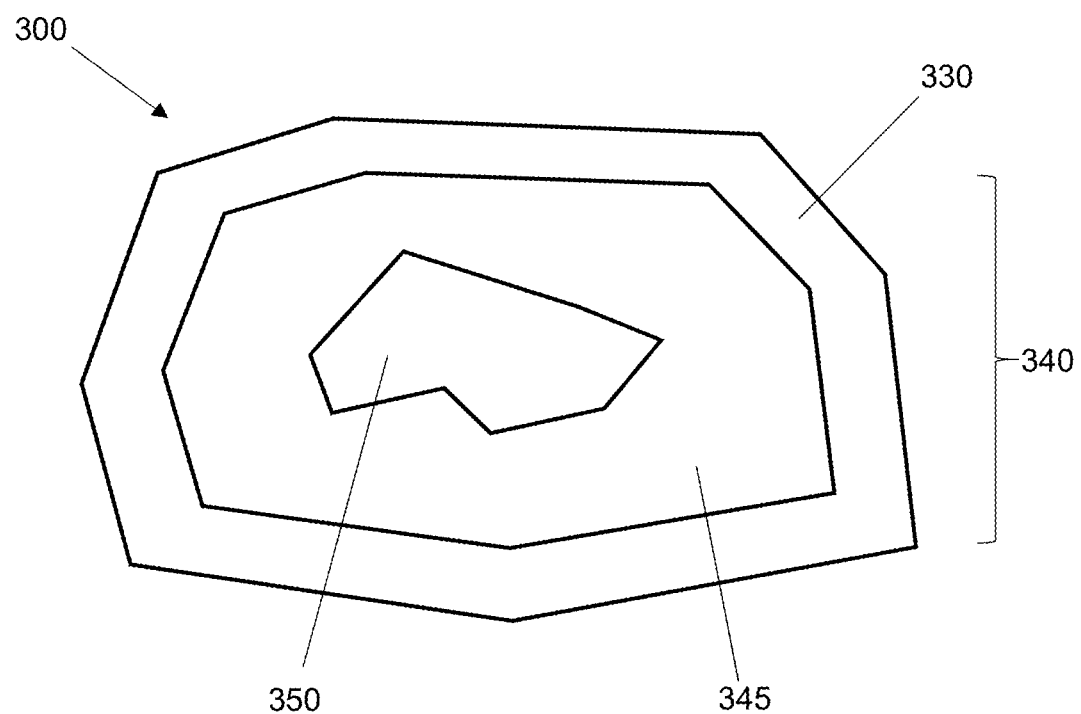
FIG. 3 is a schematic cross-sectional view of a mineral roofing granule according to another embodiment of the disclosure.
Figure 4:
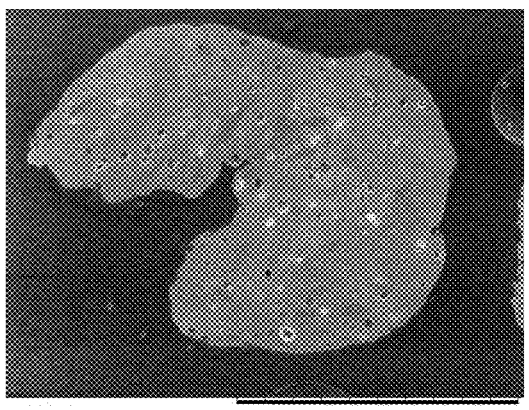
FIGS. 4-6 are sets of scanning electron micrographs of various example granules at low, mid, and high magnification, respectively.
Figure 4:
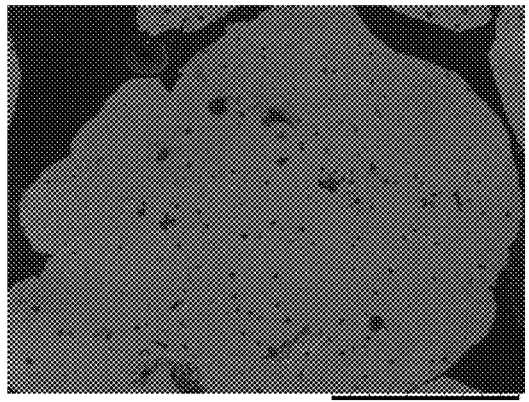
Figure 4:
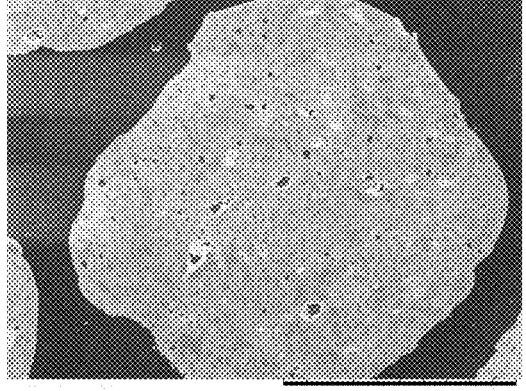
Figure 4:
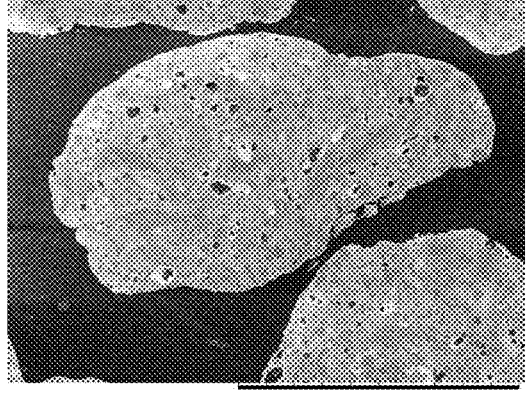
Figure 5:
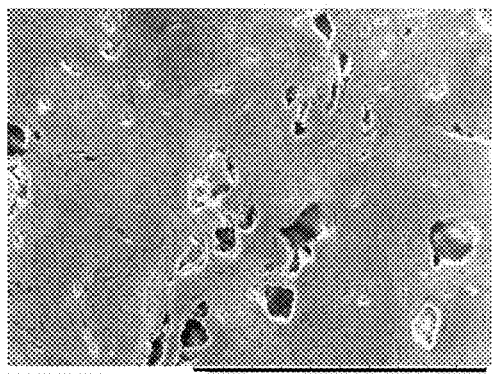
Figure 5:
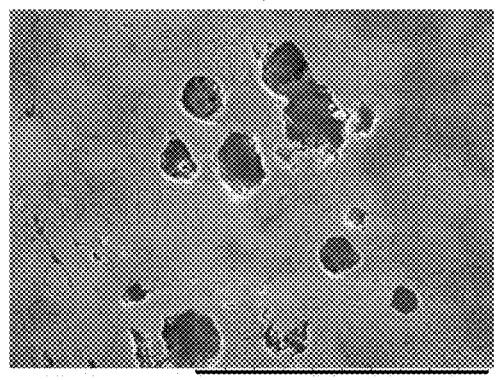
Figure 5:
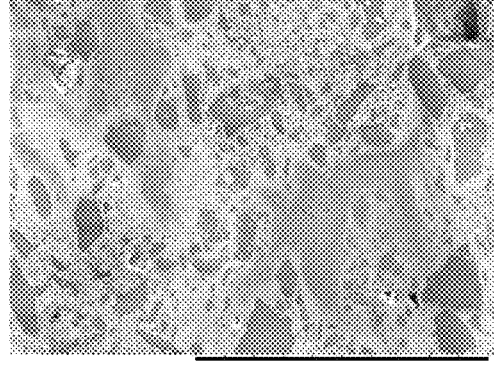
Figure 5:
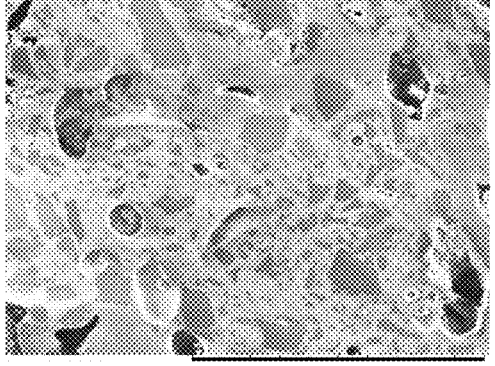
Figure 6:
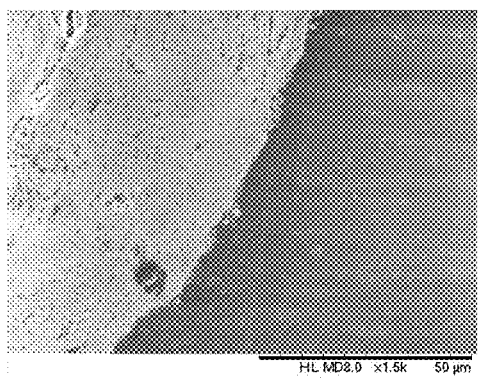
Figure 6:
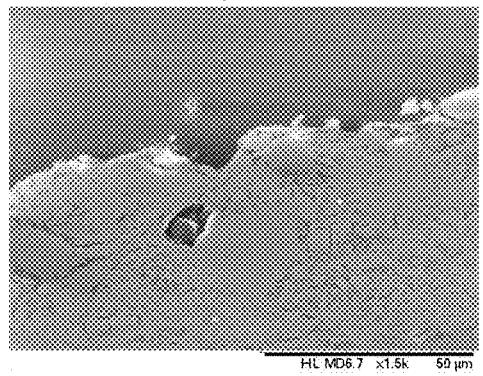
Figure 6:
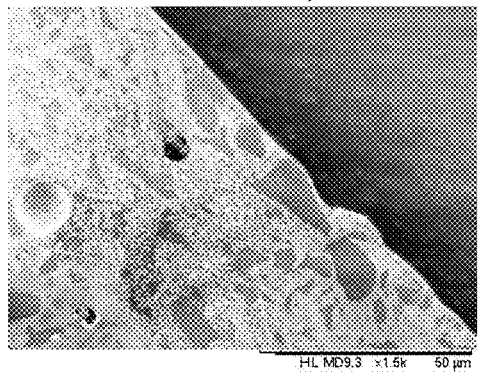
Figure 6:
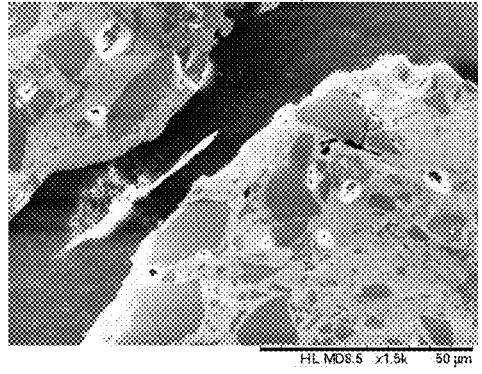
Figure 7:
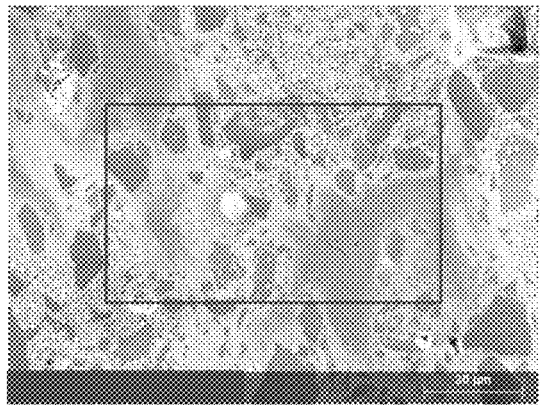
FIGS. 7 and 8 are sets of SEM-EDS images of two example granules.
Figure 7:
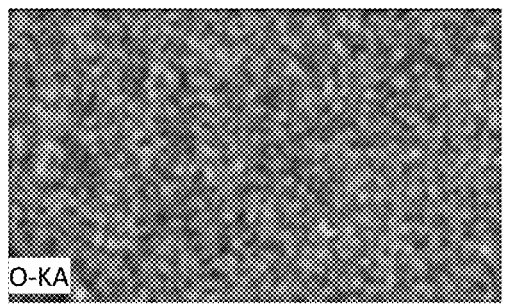
Figure 7:
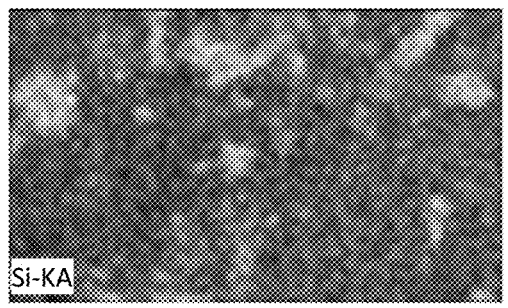
Figure 7:
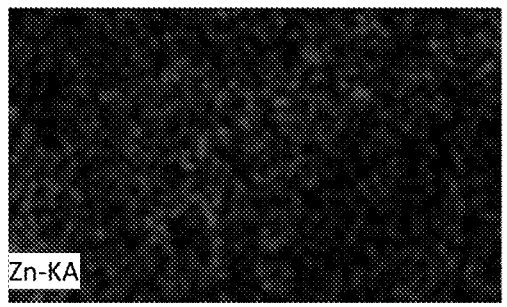
Figure 7:
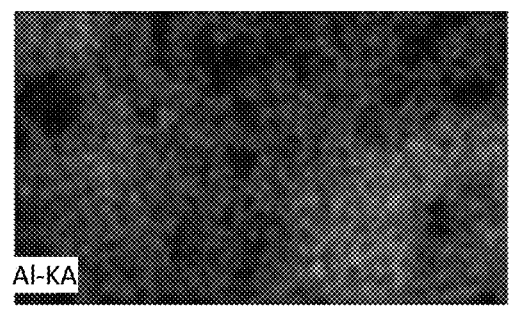
Figure 8:
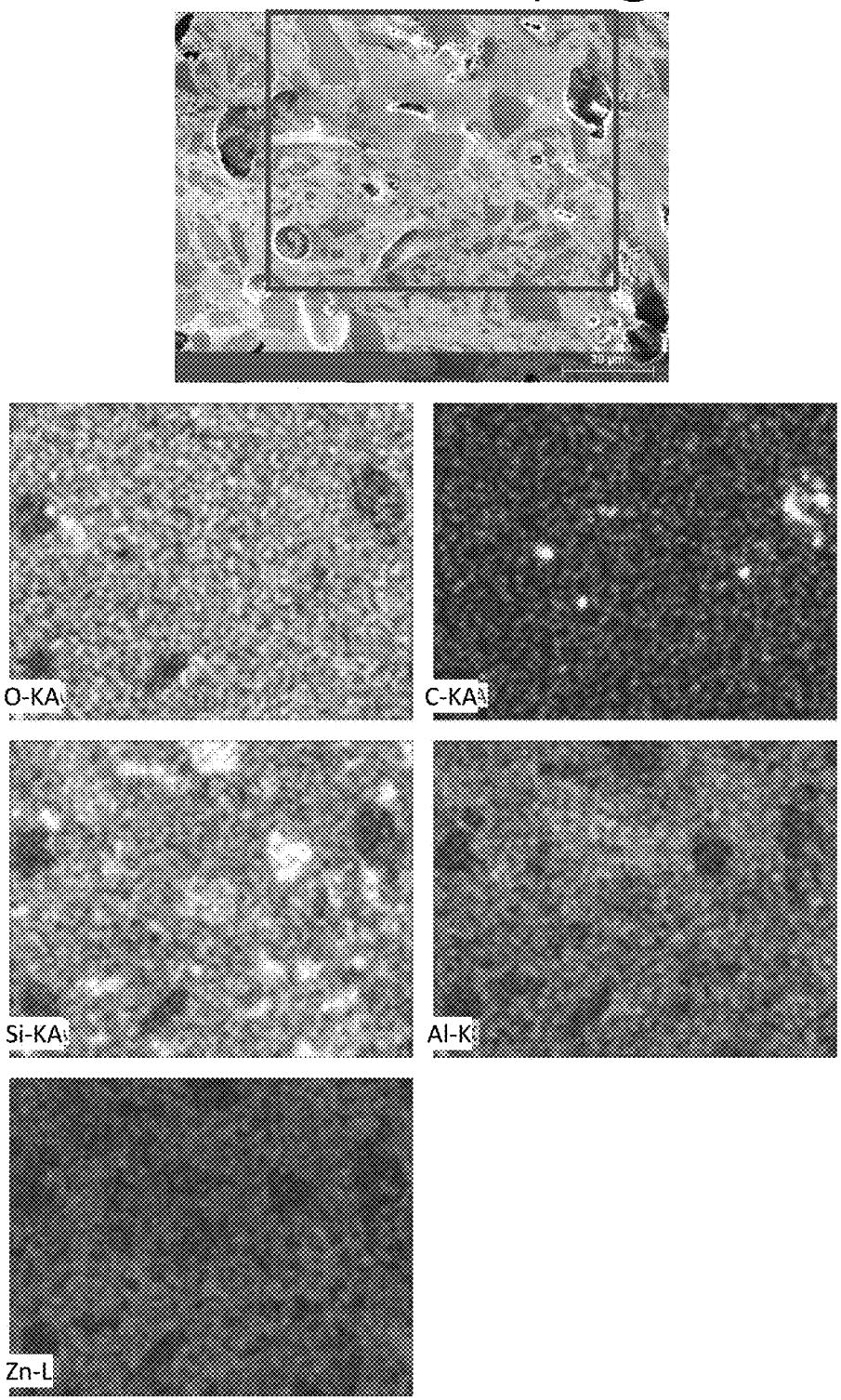
Figure 9:
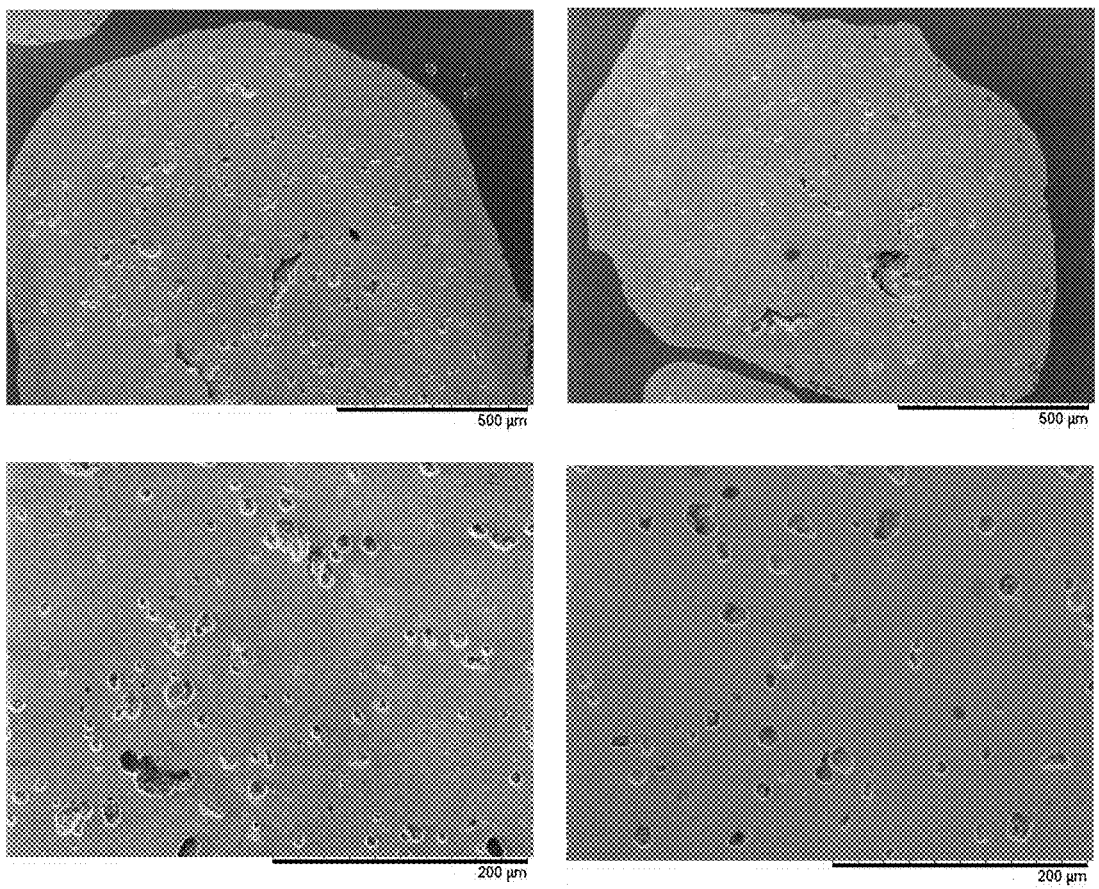
FIG. 9 is a set of scanning electron micrographs of an example granule made with only kaolin clay.

In other embodiments, the mineral core includes both a second fired material and a base mineral particle, with the second fired material (e.g., as described above) disposed about the mineral particle. Such an embodiment is shown in schematic cross-sectional view in FIG. 3. Mineral roofing granule 300 includes a mineral shell 330 disposed about a mineral core 340. Mineral core 340 includes a second fired material 345 around a base mineral particle 350. Use of a base mineral particle can be advantageous in that it can act as a seed for a granulation process, and moreover can reduce the cost of the overall roofing granule by reducing the amount of highly purified clay used.

In the core/shell mineral roofing granules as described herein, the mineral shell can be of a variety of thicknesses. For example, in various embodiments of the core/shell mineral roofing granules as otherwise described herein, the average shell thickness is in the range of about 20 microns to about 500 microns, e.g., about 20 microns to about 350 microns, or about 20 microns to about 200 microns, or about 50 microns to about 500 microns, or about 50 microns to about 350 microns, or about 50 microns to about 200 microns, or about 100 microns to about 500 microns, or about 100 microns to about 350 microns, or about 100 microns to about 200 microns.

The mineral roofing granules as described herein can advantageously have very high solar reflectance values. For example, in certain embodiments, the mineral roofing granules as otherwise described herein have a solar reflectance of at least 70%, at least 75%, or even at least 80%. Solar reflectance is measured of the granules disposed on a flat surface (e.g., in a petri dish) packed to provide a flat surface (i.e., so that only granules are visible from above) using a solar reflectometer pursuant to ASTM C1549.

Notably, the mineral roofing granules, as a result of decreased porosity at the mineral outer surface, can be resistant to staining. For example, in certain embodiments, the mineral roofing granules as otherwise described herein have a stain resistance drop of no more than 4 percentage points, no more than 3 percentage points, no more than 2 percentage points, or even no more than 1 percentage point. Stain resistance drop is measured by embedding the granules in a bituminous material and aging the resulting shingle at 70° C. for 4 days as described in detail in the examples below; the stain resistance drop is the difference between the solar reflectivity of the shingle before the aging and the solar reflectance of the shingle after the aging. Moreover, without intending to be bound by theory, the inventors believe that the use of feldspar, nepheline syenite and/or sodium silicate as described herein (especially in combination with a zinc source) can provide the granule with a relatively smoother surface, as a result of partial liquefaction at high temperature. In some circumstances such roofing granules can be more resistant to soiling (e.g., as measured by ASTM D7897). A smoother surface can provide fewer opportunities for dirt trapping and as such can result in smaller drop in solar reflectance due to soiling.

As the person of ordinary skill in the art will appreciate, the mineral roofing granules described herein can be provided as a collection of a plurality of granules (e.g., in collections weighing at least 1 kg, e.g., at least 10 kg). Such a collection of granules will have a median particle size, e.g., in the range of about 0.5 mm to about 5 mm in longest dimension. In certain embodiments, the collection of granules can have sizes ranging from −12 U.S. mesh to +50 U.S. mesh, e.g., −10 U.S. mesh to +40 U.S. mesh. The particle size distribution can, for example, be unimodal, bimodal, or have some more complex distribution. Two or more lots of granules having different predetermined initial particle-size distributions can be combined to provide a mixture of granules having predetermined final particle-size distribution, such as a bimodal particle-size distribution. Preferably, the predetermined final particle-size distribution and the granule shape are selected to maximize coverage of a shingle or membrane surface by the granules. Desirable granule shapes include, for example, flat- or plate-like shapes; cylindrical, spherical and ellipsoidal shapes are also suitable for use. The person of ordinary skill in the art will appreciate that the granulation method can strongly influence the shape, with high-shear mixing tending to provide more spherical granules, and roll compaction tending to provide more angular granules. Preferably, the predetermined final particle-size distribution is selected to provide at least 85 percent surface coverage when the granules are embedded in a bituminous surface, more preferably at least 90 percent, and still more preferably at least 97 percent.

U.S. Pat. No. 8,722,140, which is hereby incorporated herein by reference in its entirety, describes a number of additional desirable characteristics for mineral roofing granules; the mineral roofing granules can be made having these desirable characteristics.

Moreover, the granules described herein can be provided with a coating disposed on their mineral outer surfaces. For example, such a coating can be derived from a material selected from silanes, siloxanes, polysiloxanes, organo-siloxanes, silicates, organic silicates, silicone resins, acrylics, urethanes, polyurethanes, glycol ethers and mixtures thereof. Examples of coatings and methods for coating are described in U.S. Pat. App. Publication no. 20110081537, U.S. Pat. Nos. 7,241,500, 3,479,201, 3,255,031, and 3,208,571, all of which are incorporated herein by reference in their entirety for all purposes. In certain desirable embodiments, the coating has a transmittance to visible radiation of at least 80%, at least 90%, or even at least 95%.

Another aspect of the disclosure is a method for making a mineral roofing granule as described herein. The method includes providing a green granule having at its outer surface a first mixture comprising an aluminosilicate clay, and firing the green granule to provide the mineral roofing granule. The firing converts the first mixture to the first fired composition.

The methods described generally in U.S. Pat. No. 8,722,140, which is hereby incorporated herein by reference in its entirety, can be used by the person of ordinary skill in the art in conjunction with the description herein to provide the mineral roofing granules of the present disclosure. Moreover, processes which can be used or adapted for use in preparing the roofing granules of the present disclosure include processes for preparing synthetic proppant materials, such as processes for preparing high strength proppants from clay, and mixtures of clay with other materials, such as disclosed, for example, in U.S. Pat. Nos. 4,251,265, 4,668,645, 4,555,493, 4,921,820, 5,120,455, and 7,036,591, each of which is incorporated herein by reference. Other useful processes include processes for producing high strength proppants from bauxite, such as are disclosed, for example, in U.S. Pat. Nos. 4,440,866, 4,639,427, 4,712,203, 4,879,181, 5,175,133, each of which is incorporated herein by reference. Still other useful processes include processes for preparing high strength proppants from composite materials, such as disclosed, for example, in U.S. Pat. Nos. 4,944,905, 6,753,299, 6,983,797, and 7,678,723, each of which is incorporated herein by reference.

The first mixture can have the mineral components as described above (e.g., as identified and in the same amounts) with respect to the first fired mixture. Moreover, as the person of ordinary skill in the art will appreciate, the first mixture can further include one or more solvents (e.g., water, an organic solvent such as a lower alcohol). As noted above, the amount of the solvent is not used in the calculation of the amounts of the components of a such a mixture to be fired. The first mixture can also further include a binder. As the person of ordinary skill in the art will appreciate, a binder can improve pelletizing and other forming processes, and can help to increase the strength of the green granules. Suitable binders include, for example, a starch, a resin, a wax, a glue such as AR animal glue, gelatinized cornstarch, calcium carbonate and polyvinyl alcohol. A binder can be used in amounts, for example, up to 6 wt % of the first mixture, e.g., up to 3% or up to 2%.

The green roofing granule can be formed in a variety of manners. For example, in certain embodiments, granulation is used to provide the green granule, i.e., to provide the first mixture at the outer surface of the green granule. A variety of granulation processes familiar to the person of ordinary skill in the art can be used. For example, in certain embodiments of the methods as otherwise described herein, wet granulation (e.g., high-shear granulation) is used to provide the green granule, i.e., to provide the first mixture at the outer surface of the green granule. In other methods as otherwise described herein, dry granulation (e.g., roll compaction) is used to provide the green granule, i.e., to provide the first mixture at the outer surface of the green granule. In other embodiments, extrusion is used to provide the green granule, i.e., to provide the first mixture at the outer surface of the green granule. In other embodiments, spray-drying is used to provide the green granule, i.e., to provide the first mixture at the outer surface of the green granule. In other embodiments, press forming is used to provide the green granule, i.e., to provide the first mixture at the outer surface of the green granule. In other embodiments, calendaring is used to provide the green granule, i.e., to provide the first mixture at the outer surface of the green granule. The person of ordinary skill in the art will, on the basis of the description herein, adapt these processes for the formation of green, firable granules.

The person of ordinary skill in the art will appreciate that when a single fired mixture (e.g., a first fired mixture) is the only mixture to be fired, then the granulation, calendaring, extrusion, or press forming can be used to provide the entire green granule in a single step. When there are multiple mixtures to be fired (e.g., in the multi-layer embodiments described with respect to FIGS. 2 and 3), the person of ordinary skill in the art can perform steps in sequence. For example, in certain embodiments, a method for making particles as described herein includes providing a green particle core. The green particle core can be, e.g., a firable second mixture, e.g., with components as described above with respect to the granules of FIGS. 2 and 3, and optionally including a solvent and/or a binder as described above with respect to the first mixture. The first mixture can be layered on the green particle core, e.g., by granulation, to form a green granule body (of the second mixture) disposed about a green granule shell (of the first mixture). This green granule can then be fired to provide the mineral roofing granule. The green granule core can consist only of the second mixture (e.g., to form a granule as described with respect to FIG. 2), or can include the second mixture disposed about a base mineral particle (e.g., to form a granule as described with respect to FIG. 3).

In other embodiments, the green particle is formed by providing a mineral granule core, then forming a green granule shell disposed about the mineral granule core. Here, the mineral granule core can be, e.g., a second fired material as described above, made by forming a green body of a second mixture as described above then firing it to provide the mineral granule core. This process can be advantageous in that it can allow the second fired material of the mineral granule core to be fired at a higher temperature then the first fired material of the mineral granule shell. This can allow for the mineral granule core to provide high solar reflectance, while the mineral granule shell provides a low porosity to prevent staining. In other embodiments, the mineral granule core is a base mineral particle, as described above.

The firing of the first mixture to provide the first fired material can be performed at a variety of temperatures. As described herein, lower temperatures can be advantageous from the standpoint of decreasing the formation of cristobalite and from the standpoint of decreasing the formation of undesirable mineral phases. Lower temperatures can also help to provide higher solar reflectance. But in some embodiments higher temperatures can be desirable from the standpoint of providing a mineral roofing granule with an overall high strength. In certain embodiments of the processes as otherwise described herein, the firing is performed at a temperature in the range of 800-1300° C., e.g., 800-1250° C., or 800-1200 C., or 800-1150° C., or 800-1100° C., or 800-1050° C., or 900-1300° C., or 900-1250° C., or 900-1200° C., or 900-1150° C., or 900-1100° C., or 900-1050° C.

The green granules can be screened to provide the desired particle size distribution to a collection of roofing granules. Screening can also (or alternatively) be performed on the as-fired particles.

Another aspect of the disclosure is a mineral roofing granule, or a collection thereof as described above, made by a process as described herein.

Another aspect of the disclosure is a roofing membrane or shingle including a collection of mineral roofing granules described herein embedded in a bituminous surface. The mineral roofing granules can be embedded in the bituminous surface by applying a mixture of mineral roofing granules having a particle-size distribution to the bituminous surface. Alternatively, two or more mixtures of mineral roofing granules having different particle-size distributions can be applied successively or simultaneously to the bituminous surface. Methods for making such roofing membranes and shingles are familiar to the person of ordinary skill in the art, and are described further in U.S. Pat. No. 8,722,140, which is hereby incorporated herein by reference in its entirety.

Various aspects of the disclosure are further described by the examples below.

EXAMPLES

Various mineral roofing granules were made using the following procedure: Firable mixtures were formed by mixing ~1 wt % modified starch, ~15% water and the balance mineral components (2 kg) in an high-shear mixer for a total of about 7 minutes. The procedure consistent of 1 min. dry mixing, 1 min. low intensity mixing while adding water, and 5 min. high intensity mixing for green granule formation via granulation. Each batch was of a scale sufficient to make about 1.75 kg of mineral roofing granules.

After granulation, the green granules were dried and the dried green granules were sieved through a sieve having a 3.35 mm mesh size (size 6) and falling on a sieve having a 0.425 mm mesh sieve (size 40) in order to remove large particles and very fine dust. After sieving, the green granules were fired at high temperatures (1050-1250° C.), as indicated in the data. The granules were batch fired by heating at a rate of 5° C./min to maximum temperature, held for one hour, and then cooled at a rate of 5° C./min.

The mineral roofing granules so made were evaluated for solar reflectance using ASTM C1549, and their color was measured with a Hunter LabScanXE. Mechanical strength was qualitatively evaluated by pressing a cylinder of particles at a defined pressure and measuring the amount of fines which passed through a 40 mesh screen. Zinc leaching was evaluated by placing a 4 g of granules in 200 mL of buffer and evaluating the zinc concentration in the water over time.

Fired mineral roofing granules were made into mini shingles to evaluate membrane properties. An asphalt patty was heated for 45 seconds using a heat gun at 1000° F. Once the asphalt was sufficiently heated, the granule blends were spread on top and then rolled with an 8 lb steel roller. Afterwards the shingles were pressed individually in a Carver press at moderate pressure (i.e., by hand, at a pressure sufficient for the operator to feel slight resistance, with a general target of 200 psi) for 45 seconds. The mini shingles were then evaluated for staining by placing them in an oven at 70° C. for 4 days. The change in solar reflectance before and after the 70° C. treatment is taken as the stain resistance drop described above. They were also evaluated for aged solar reflectance as described in ASTM D7897.

The table below shows data for a variety of combinations of mineral components and firing temperatures. The components used were Kaobrite 90 kaolin (KB); MINSPAR™ 4 feldspar (M4) and ZoChem ZOCO 102 zinc oxide (ZnO, 100-200 nm particle size).

| Mineral components (wt %) | Calc. Temp., ° C. | Granule SR, % | Membrane SR, % | Stained SR, % | Surface porosity, % | Avg pore diameter, microns | LPD, g/mL | Density, g/mL |
| --- | --- | --- | --- | --- | --- | --- | --- | --- |
| KB (100) | 1200 | 81.5 | 69.1 | 49.5 | 28.3% | 0.050 | 1.27 | 2.76 |
| KB (80), M4 (20) | 1200 | 81.0 | — | — | — | — | — | — |
| KB (80), ZnO (20) | 1200 | 84.3 | 73.6 | 57.2 | 34.7% | 0.100 | — | — |
| KB (50), M4 (30), ZnO (20) | 1200 | 71.6 | 61.4 | — | — | — | 1.61 | — |
| KB (100) | 1250 | 79.0 | 68.5 | 63.3 | 12.6% | 0.043 | 1.38 | — |
| KB (80), M4 (20) | 1250 | 81.1 | 66.0 | 61.5 | 10.8% | 0.103 | 1.36 | — |
| KB (80), ZnO (20) | 1250 | 85.0 | 69.9 | 59.6 | — | — | 1.40 | — |

-continued

| Mineral components (wt %) | Calc. Temp., °C. | Granule SR, % | Membrane SR, % | Stained SR, % | Surface porosity, % | Avg pore diameter, microns | LPD, g/mL | Density, g/mL |
|---|---|---|---|---|---|---|---|---|
| KB (50), M4 (30), ZnO (20) | 1250 | 72.3 | 62.0 | 61.7 | 1.30% | 0.108 | 1.60 | 2.75 |

FIGS. 4-9 are sets of scanning electron micrographs of various of the granules described above. The materials including zinc and feldspar demonstrate the apparently different microstructure with Si-rich areas as determined by SEM-EDS and formation of a glassy phase.

Figure 11:
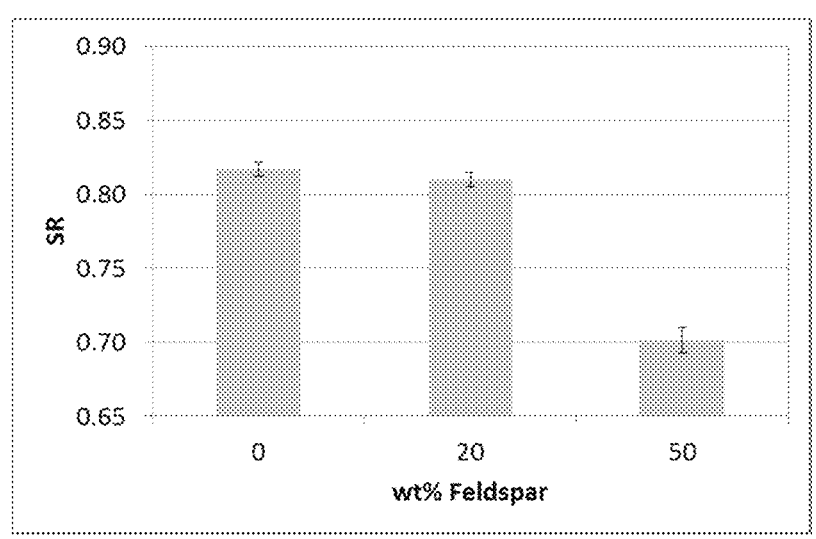
FIG. 11 is a graph of solar reflectance vs. feldspar content for granules made with kaolin and K-,Na-feldspar.
Figure 12:
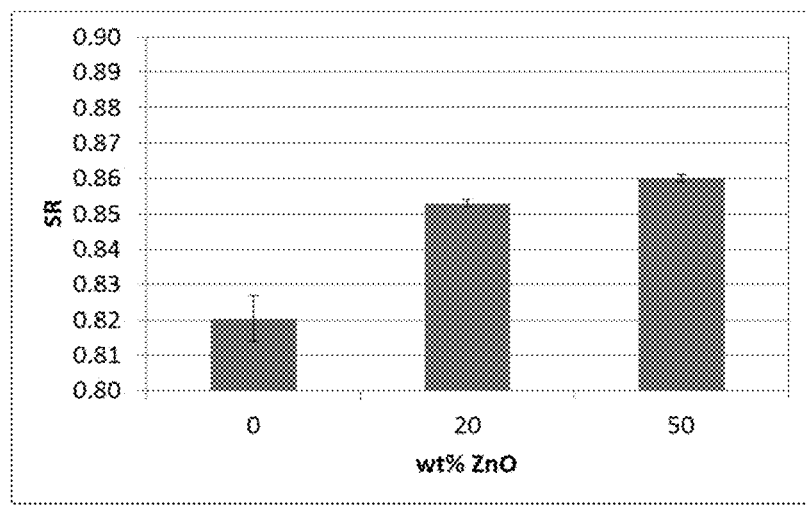
FIG. 12 is a graph of solar reflectance vs. ZnO content for granules made with kaolin and ZnO.

FIG. 11 is a graph of solar reflectance vs. feldspar content for granules made with kaolin and K-,Na-feldspar; and FIG. 12 is a graph of solar reflectance vs. ZnO content for granules made with kaolin and ZnO, both at a firing temperature of 1250° C. The addition of feldspar to kaolin clay was found to decrease granule solar reflectance, believed to be due to densification and formation of an amorphous glassy phase. In contrast, ZnO was found to increase the solar reflectance of the clay granules, with an addition of 20 wt % of ZnO resulting in a solar reflectance value of 85 (a 3 point increase). An additional 30 wt % of ZnO (to 50 wt % total) only increased the solar reflectance by one additional point.

Figure 13:
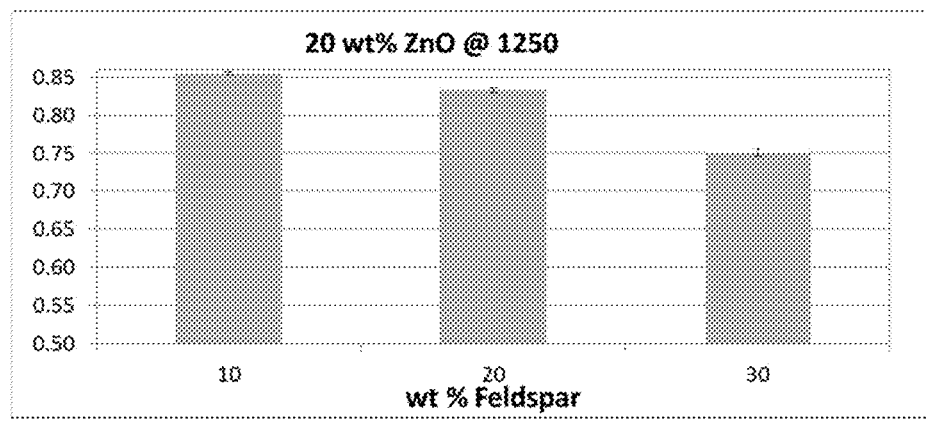
FIG. 13 is a graph of solar reflectance vs. feldspar content for granules made with 20 wt % ZnO and the balance kaolin and K-,Na-feldspar, fired at 1250° C.
Figure 14:
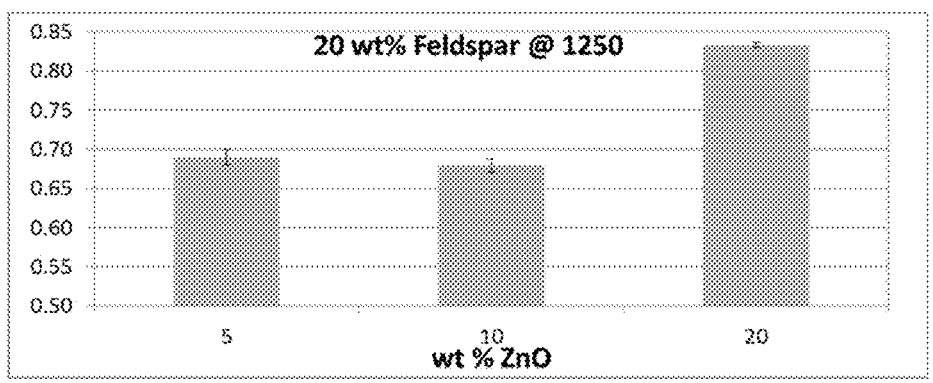
FIG. 14 is a graph of solar reflectance vs. ZnO content for granules made with 20 wt % K-,Na-feldspar and the balance kaolin and ZnO, fired at 1250° C.

FIG. 13 is a graph of solar reflectance vs. feldspar content for granules made with 20 wt % ZnO and the balance kaolin and K-,Na-feldspar, fired at 1250° C.; and FIG. 14 is a graph of solar reflectance vs. ZnO content for granules made with 20 wt % K-,Na-feldspar and the balance kaolin and ZnO, fired at 1250° C. Notably, the combined addition of feldspar and ZnO provided the desired densification while preserving the solar reflectance boost, resulting in a solar reflectance value of 83.

Figure 15:
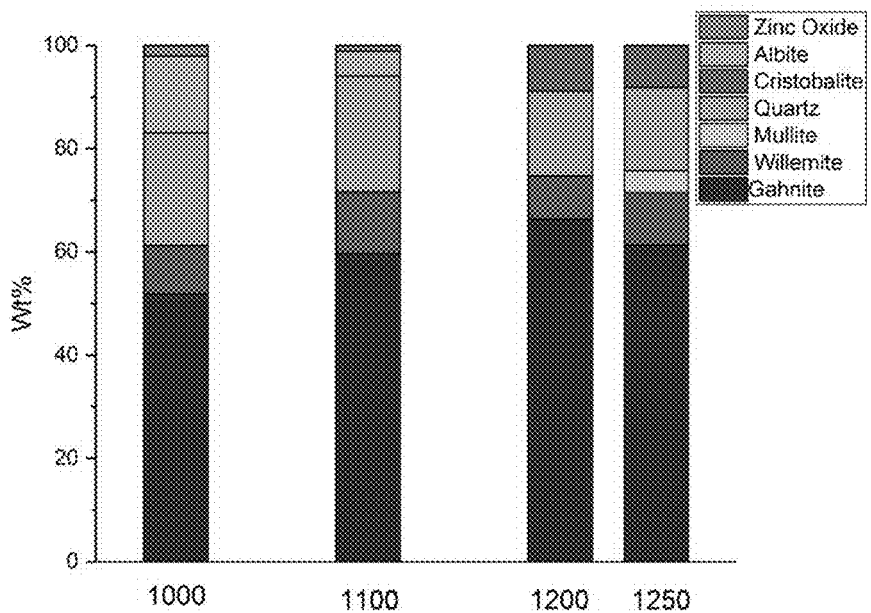
FIG. 15 is a set of quantitative XRD analyses for samples made from 50 wt % kaolin, 20 wt % ZnO and 30 wt % feldspar, fired at various temperatures (1000-1250° C.).

The phase composition of the granules was determined using XRD. FIG. 15 is a set of quantitative XRD analyses for samples made from 50 wt % kaolin, 20 wt % ZnO and 30 wt % feldspar, fired at various temperatures (1000-1250° C.). The data are provided in the table below, in which values are in wt % as a fraction of total crystalline content.

| Temp. | Gahnite | Willemite | Mullite | Quartz | Cristobalite | Albite | Zinc oxide |
|---|---|---|---|---|---|---|---|
| 1000 C. | 51.77 | 9.45 | 0 | 21.85 | 0 | 14.82 | 2.11 |
| 1100 C. | 59.61 | 11.96 | 0 | 22.54 | 0 | 4.73 | 1.16 |
| 1200 C. | 66.38 | 8.3 | 0 | 16.47 | 8.85 | 0 | 0 |
| 1250 C. | 61.34 | 10.16 | 4.24 | 16.09 | 8.17 | 0 | 0 |

Major phases detected at all temperatures are gahnite ($ZnAl_2O_4$), willemite ($Zn_2SiO_4$), and crystalline silica (quartz and cristobalite forms); some unreacted albite ($NaAlSi_3O_8$) and ZnO were still present at lower temperatures (below 1200° C.), and mullite ($Al_6Si_2O_{13}$) appears in samples sintered at 1250° C. In all samples, gahnite is a dominant crystalline phase, and its amount is about 5 times higher than the amount of willemite. This is in accordance with literature findings that have shown quantity of gahnite to be increasing on the account of willemite with increase of temperature (See FIG. 10). Quantitative comparison of these phases in samples sintered at different temperatures is not possible based on these results, since they do not account for any amorphous phases that may be present. It is, however, clear that a certain amount of quartz or amorphous silica transforms into the cristobalite form when temperature reaches ~1200° C. According to high-temperature XRD analysis (performed for this sample as well) a mullite phase is not present at 1150° C., but does appear at 1200° C. The presence of gahnite and willemite is confirmed already at 900° C. and all the way until 1300° C. The amount of the quartz phase decreases with increasing temperature while the amount of the high-temperature crystalline silica form, cristobalite, increases.

Figure 16:
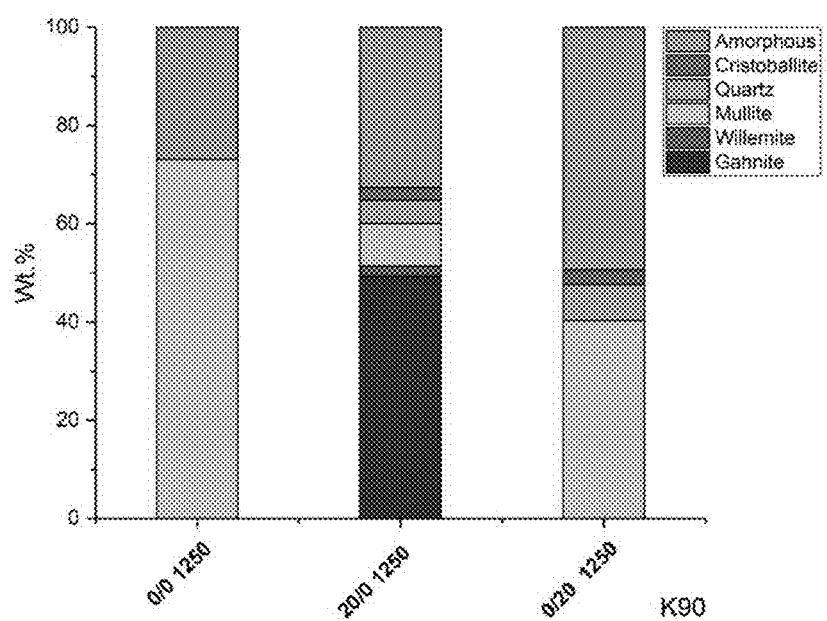
FIG. 16 is a graph showing the quantitative phase composition via XRD of granules made from of pure kaolin clay, kaolin clay with 20 wt % ZnO, and kaolin clay with 20 wt % of feldspar, after firing at 1250° C.

FIG. 16 is a graph showing the quantitative phase composition via XRD (here, including amorphous material) of granules made of pure kaolin clay, kaolin clay with 20 wt % ZnO, and kaolin clay with 20 wt % of feldspar, after firing at 1250° C. The data are shown in the table below, in which values are in wt %.

|  | Gahnite | Willemite | Mullite | Quartz | Cristobalite | Amorphous |
|---|---|---|---|---|---|---|
| clay |  |  | 73.1 |  |  | 26.9 |
| clay + 20 ZnO | 49.36 | 2.07 | 8.62 | 4.73 | 2.55 | 32.67 |
| clay + 20 feldspar | 0 | 0 | 40.32 | 7.33 | 2.95 | 49.4 |

The pure clay sample was found to consist mainly of mullite phase (~70 wt %) and amorphous phase. The use of feldspar increases the amount of amorphous phase to almost ~50%, decreases amount of mullite while also bringing some amount of crystalline silica in quartz and cristobalite form. Addition of ZnO on the other hand, only slightly increases the amount of amorphous phase, but replaces a majority of the mullite phase with gahnite, willemite and small amount of crystalline silica.

Figure 17:
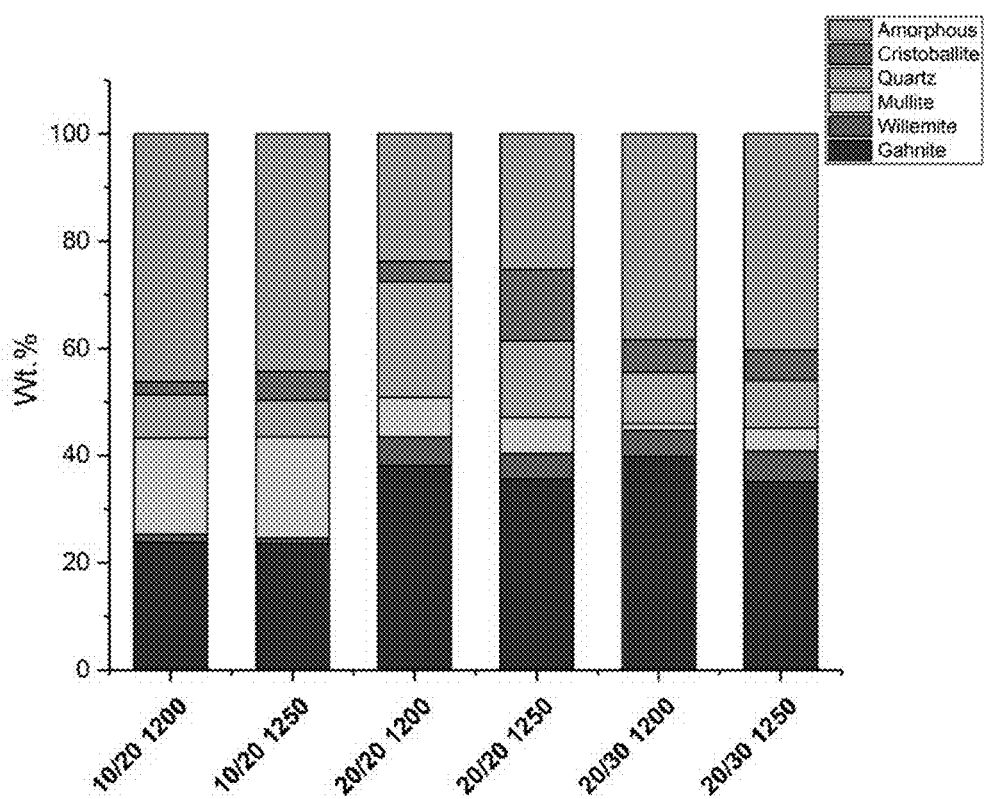
FIG. 17 is a graph showing the quantitative phase composition of via XRD of granules fired at 1200 and 1250° C.

When both ZnO and feldspar are added to clay, interestingly, no new phases were detected after sintering at 1200 or 1250° C. FIG. 17 is a graph showing the quantitative phase composition of via XRD of granules fired at 1200 and 1250° C.; the notation "X/Y" denotes X wt % ZnO and Y wt % feldspar in the mixture before firing. The data are presented in the table below, in which values are in wt %.

|  | Gahnite | Willemite | Mullite | Quartz | Cristobalite | Amorphous |
|---|---|---|---|---|---|---|
| 10/20 1200 C. | 23.79 | 1.54 | 17.88 | 8.18 | 2.39 | 46.22 |
| 10/20 1250 C. | 23.53 | 1.01 | 18.93 | 6.91 | 5.33 | 44.29 |
| 20/20 1200 C. | 38.15 | 5.3 | 7.42 | 21.65 | 3.77 | 23.71 |
| 20/20 1250 C. | 35.62 | 4.68 | 6.78 | 14.45 | 13.17 | 25.3 |
| 20/30 1200 C. | 39.73 | 4.94 | 1.26 | 9.7 | 6.05 | 38.32 |
| 20/30 1250 C. | 34.99 | 5.73 | 4.4 | 8.99 | 5.66 | 40.23 |

The amount of gahnite and willemite is dependent on the amount of ZnO additive in the raw powder; doubling the amount of ZnO almost doubles the amount of these two phases in the fired granule. Gahnite was the dominant Zn-containing phase at these temperatures, with addition of 20 wt % ZnO resulting in only ~5% willemite. A higher amount of feldspar was shown to increase the amount of amorphous phase in the sintered granule, as expected due to its role as a flux, promoting partial liquefaction of the material. A slight increase in firing temperature in all cases increased the amount of high-temperature silica form (cristobalite), while total crystalline silica amount remained constant (i.e., the amount of quartz decreased). Increase in firing temperature also increased the amount of mullite crystallized in the granules.

Without intending to be bound by theory, the inventors believe that the two zinc phases that form have different leaching kinetics in acidic environment, with zinc silicate having a higher leachability than zinc aluminate. Zinc concentrations in ZnO and $Zn_2SiO_4$ leachates were about two orders of magnitude higher than that of $ZnAl_2O_4$ leachate in acidic conditions (at pH 2.9). See Y. Tang et al., Environmental Technology, 36: 23, 2977-2986 (2015). Accordingly, being able to tune ratios of gahnite and willemite can provide the ability to tune the leaching kinetics in order to target desired Zn-concentrations in leachate to provide a desired degree of algae resistance. However, with increase in firing temperature, the amount of zinc aluminate increases while amount of zinc silicate is decreasing; the person of ordinary skill in the art will select a desired composition and firing temperature to provide desired densification in combination with algae resistance. As the person of ordinary skill in the art will also appreciate, the surface area will determine the amount of material accessible to water, and thus will also influence the leaching rate.

Figure 18:
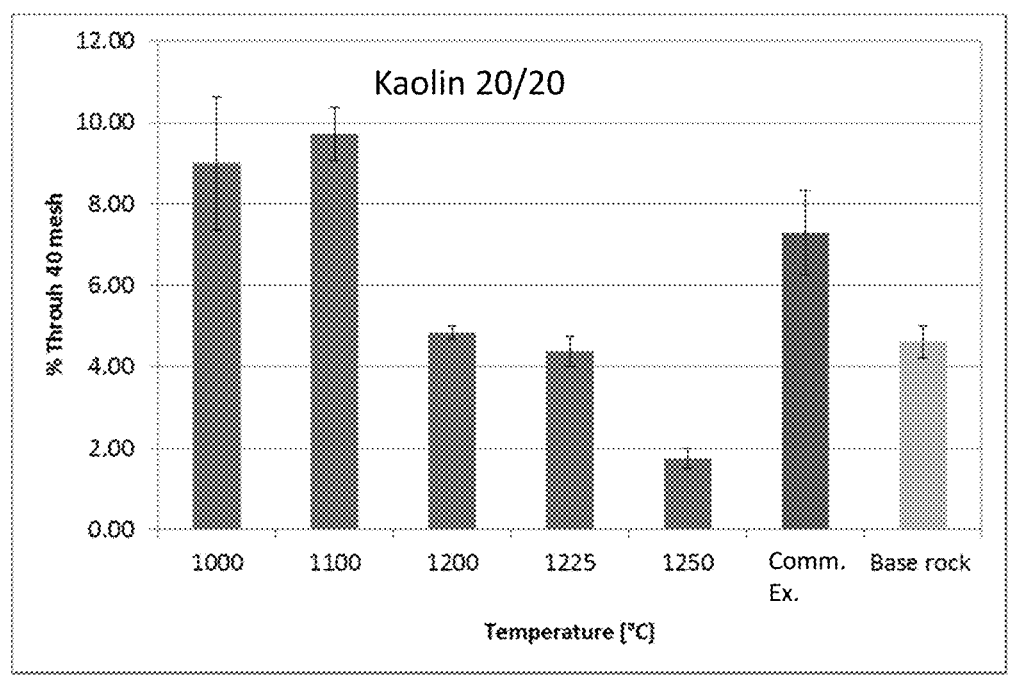
FIG. 18 is a graph of crush testing results for various granules of the disclosure.

Crush strength of prepared granules was evaluated using a crush test standardized for this purpose. Results are shown in the bar graph of FIG. 18. As can be seen, the crush strength of granules prepared from kaolin clay and 20 wt % of each additives (K90 20/20) increases increasing firing temperature, as expected. Notably, for this example, only the granules sintered above 1200° C. exhibited mechanical properties superior to an externally-purchased clay granule and similar to standard base rock granules.

Figure 19:
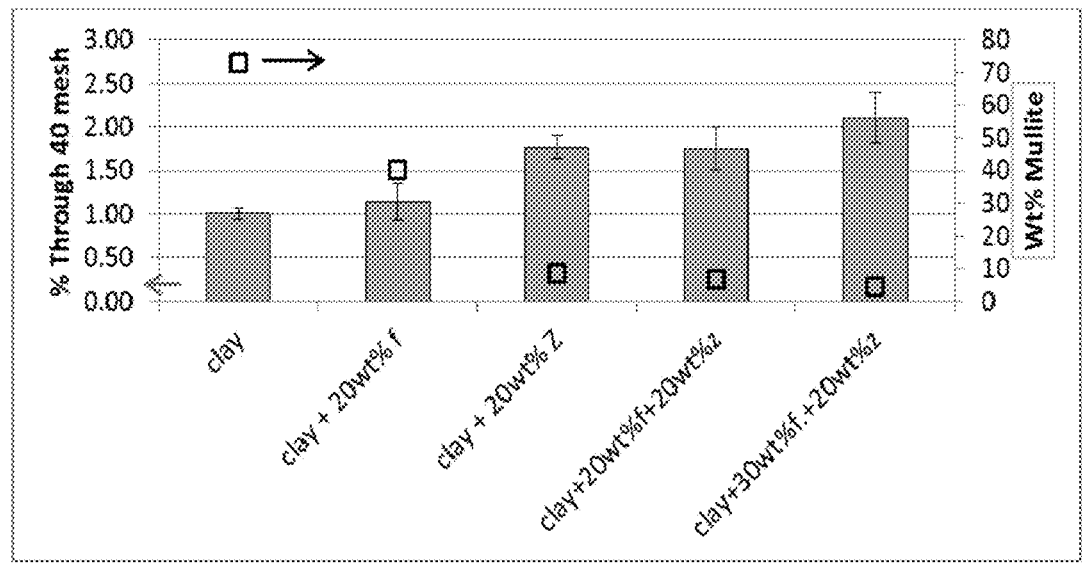
FIG. 19 is a graph showing results of the crush test for five example granules fired at 1250° C. on the left axis and quantitative amounts of mullite crystalline phase detected by XRD on the right axis

Without intending to be bound by theory, the present inventors note that the crush strength correlates with the amount of mullite in the granule. FIG. 19 is a graph showing results of the crush test for five example granules fired at 1250° C. on the left axis, with the wt % mullite in the as-fired granule on the right axis. Higher amounts of mullite phase correlated with higher crush strengths (correlation coefficient 0.92). Thus, the sample made from kaolin clay alone had the highest amount of mullite, and the highest crush strength. This is consistent with the Moh's hardness values of the dominant phases (table below), with mullite being harder than willemite; gahnite may also contribute to increased crush strength.

| Phase | Chemical formula | Moh's Hardness |
|---|---|---|
| Gahnite | $ZnAl_2O_4$ | 7.5-8 |
| Mullite | $Al_6Si_2O_{13}$ | 6-7 |
| Quartz | $SiO_2$ | 7 |
| Cristobalite | $SiO_2$ | 6-7 |
| Willemite | $Zn_2SiO_4$ | 5.5 |
| Zinc oxide | ZnO | 4-65 |

Figure 20:
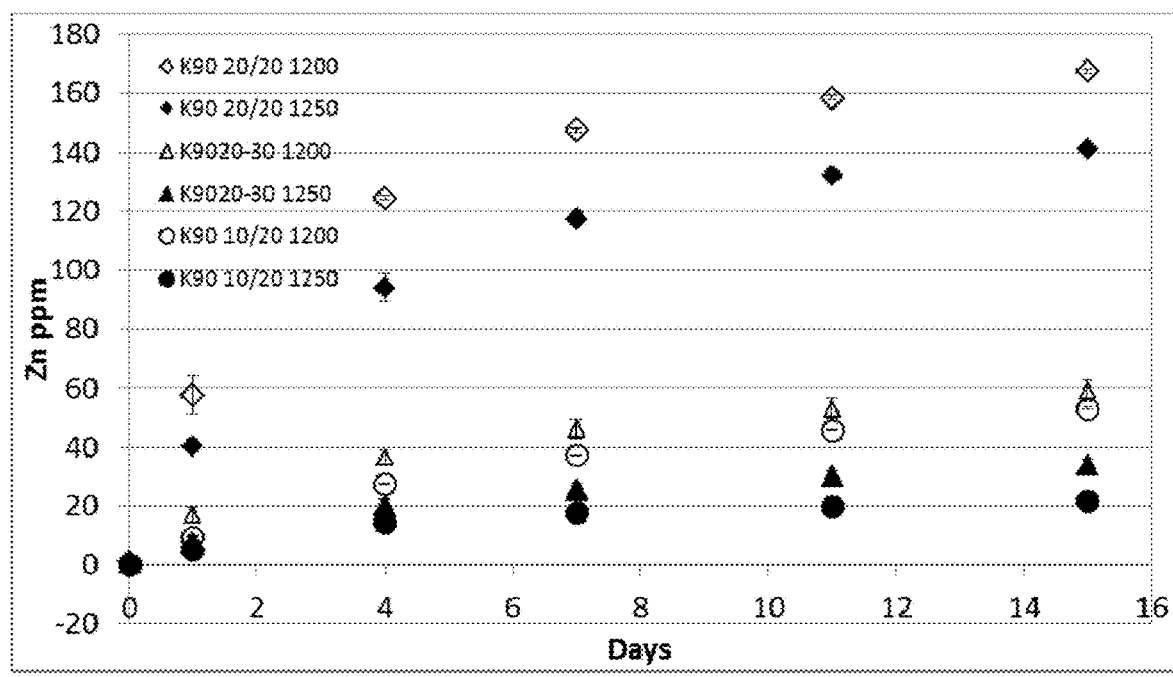
FIG. 20 is a graph of the amount of Zn ions in leachates over time for different granule samples and firing temperatures.

Granules having zinc-containing phases leach out zinc ions when placed in in slightly acidic solution; this leachability is of interest due to the known activity of zinc against algae growth. As demonstrated herein, depending on the exact composition, as well as firing temperature, the amounts and types of the Zn-containing phases in the granule can be altered, thus changing the leachability. Granules made from kaolin containing ZnO and feldspar additives in different amounts were tested for leachability over a period of 15 days. FIG. 20 is a graph of zinc leaching data (as the amount of Zn ions in leachates over time) for various granules, fired at different temperatures; "X/Y" indicates X wt % feldspar and Y wt % ZnO. As a reference, white granules having a ZnO-containing coating resulted in 650 ppm of $Zn^{2+}$ after 15 days. As can be seen in FIG. 20, despite having similar trends, granules with different composition leached different amounts of Zn ions over time. Samples made from only 10 wt % of Zn and 20 wt % feldspar (10/20) fired at 1200° C. yielded only about 50 ppm of Zn ions after 15 days. This number was greater by a factor of three when the amount of ZnO additive in the starting mixture was doubled (20/20 at 1200° C.). XRD quantification has shown that the amount of gahnite and willemite roughly double with this change in composition, causing higher concentration of Zn in the leachate. Interestingly, sample with double the amount of ZnO but also more of feldspar in the starting mixture (20/30) demonstrated relatively poor leaching behavior—despite similar amounts of gahnite and willemite phases (as confirmed by XRD) in comparison to the 20/20 example. Without intending to be bound by theory, the inventors believe that the likely reason behind this "suppressed leachability" of Zn-containing phases in the 20/30 granule is the presence of a significant amount of amorphous ("glassy") phase that prevents leaching by sealing the pores and decreasing the effective surface area exposed to leaching liquid agent. Based on the XRD results, substantially all of the zinc is believed to be crystalized into silicate and/or aluminate form in all samples, meaning that none of it is incorporated into the amorphous phase. Accordingly, the inventors believe that the primary cause for this suppressed leachability is physical in nature.

Figure 21:
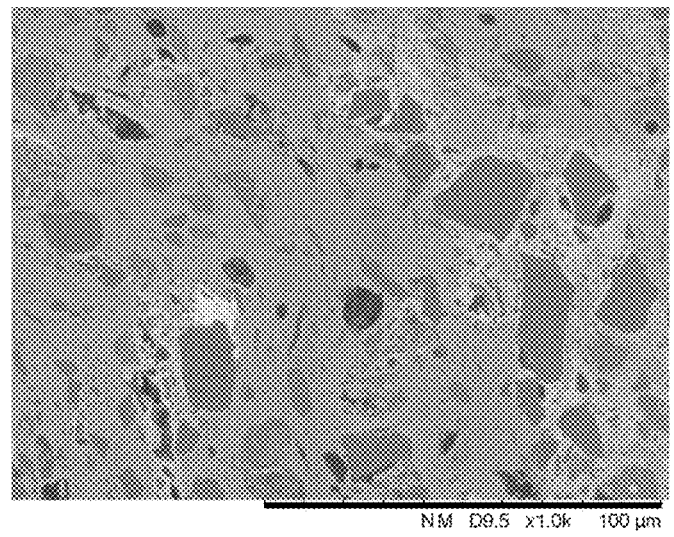
FIG. 21 is a set of two images (scale bars 100 microns and 300 microns) of a polished granule sample of the disclosure.
Figure 21:
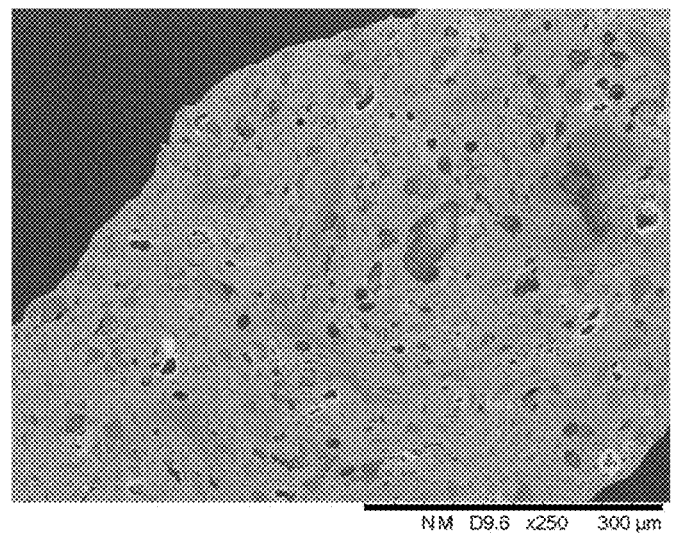
Figure 22:
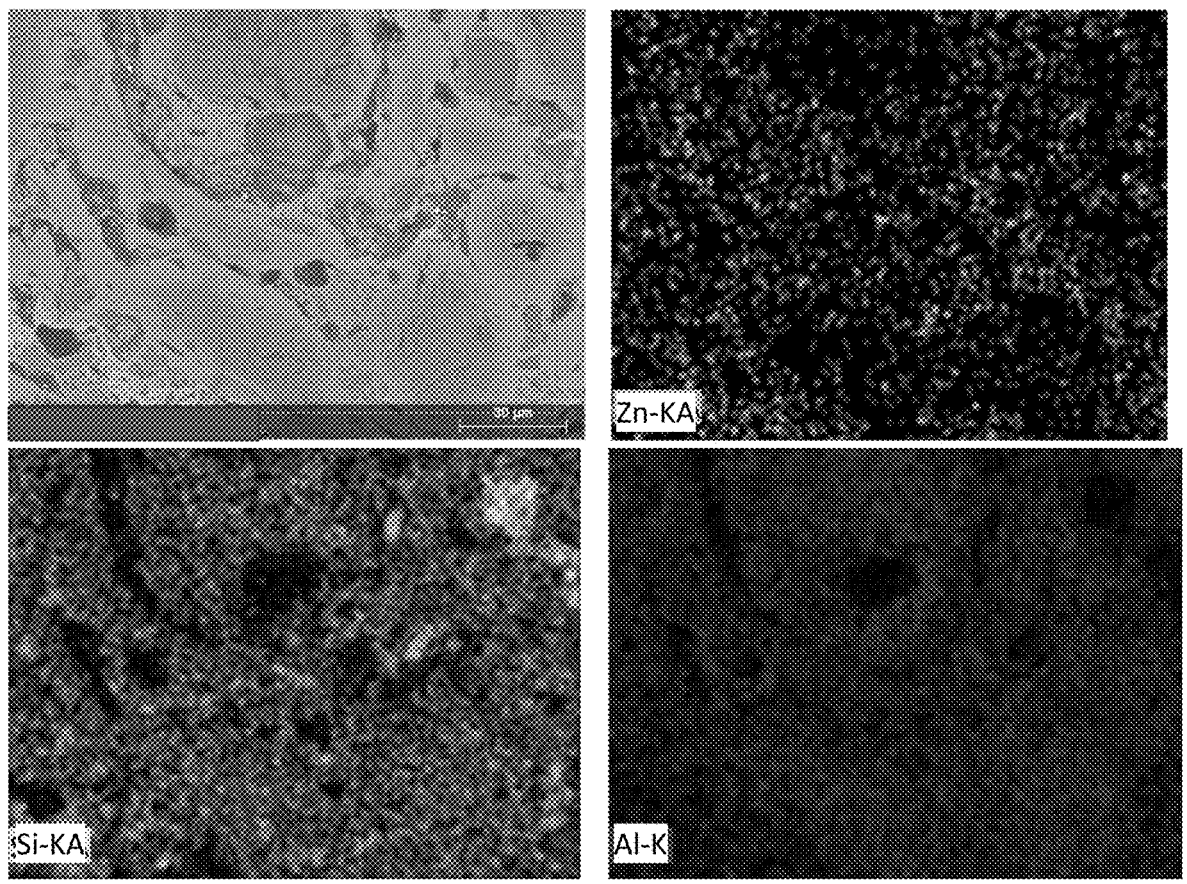
FIG. 22 is a set of EDS images of the sample of FIG. 21.

SEM/EDS imaging was used to associate detected phases with different microstructural features. FIG. 21 provides two images (scale bars 100 microns and 300 microns) of a polished 20/20 1250 sample. And FIG. 22 provides EDS mapping of the same sample, scale bar 30 microns. As can be seen, crystalline silica angular grains are spread throughout the sample. None of the other areas/features can be easily attributed to a distinct phase using EDS. Based on the EDS mapping, Zn-containing phases (aluminate and silicate) are uniformly spread throughout the sample, along with crystalline and amorphous aluminosilicates.

Figure 23:
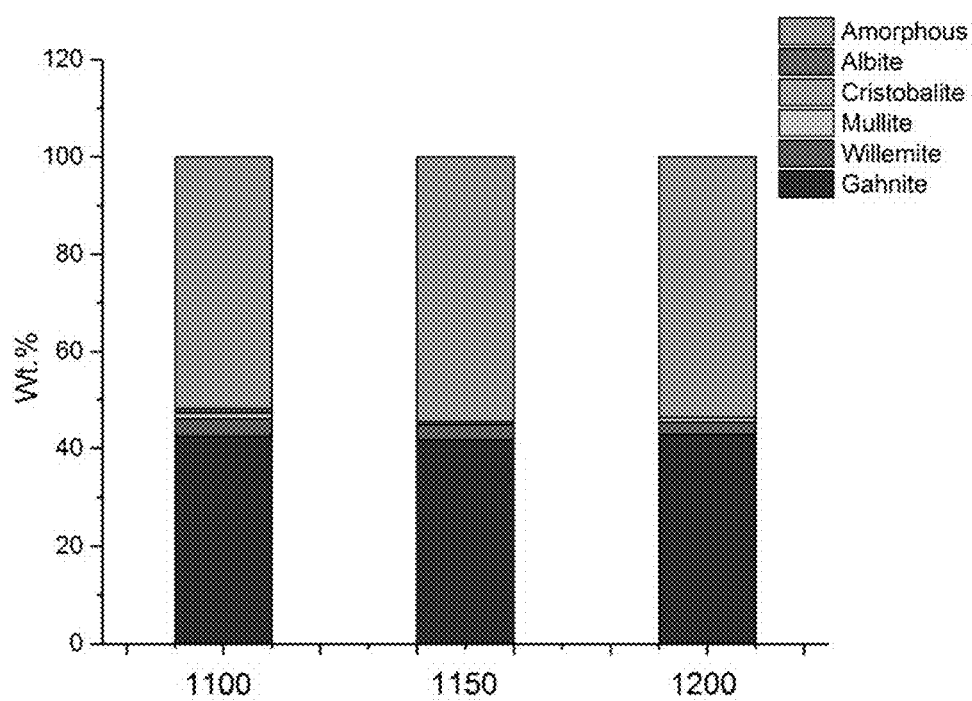
FIG. 23 is a graph showing the different phases of crystalline compounds detected in granules made from nepheline syenite-containing mixtures using firing temperatures of 1100° C., 1150° C. and 1200° C.

In another set of experiments, granules were made substantially as described above, using a firable mixture of 60 wt % kaolin (Kaobrite 90), 20 wt % ZnO (ZoChem ZOCO 102 zinc oxide), and 20 wt % nepheline syenite (Minex N10, Unimin Corp), at a variety of firing temperatures. FIG. 23 is a graph showing the different phases of crystalline compounds detected in the granules made using firing temperatures of 1100° C., 1150° C. and 1200° C. The data are presented in the table below, in which values are provided in wt %.

| Temp. | Gahnite | Willemite | Mullite | Cristobalite | Albite | Amorphous |
|---|---|---|---|---|---|---|
| 1100 C. | 42.55 | 3.59 | 1.08 | 0.14 | 0.82 | 51.82 |
| 1150 C. | 41.73 | 3.2 | | 0.5 | | 54.57 |
| 1200 C. | 42.96 | 2.42 | 0.91 | | | 53.71 |

Figure 24:
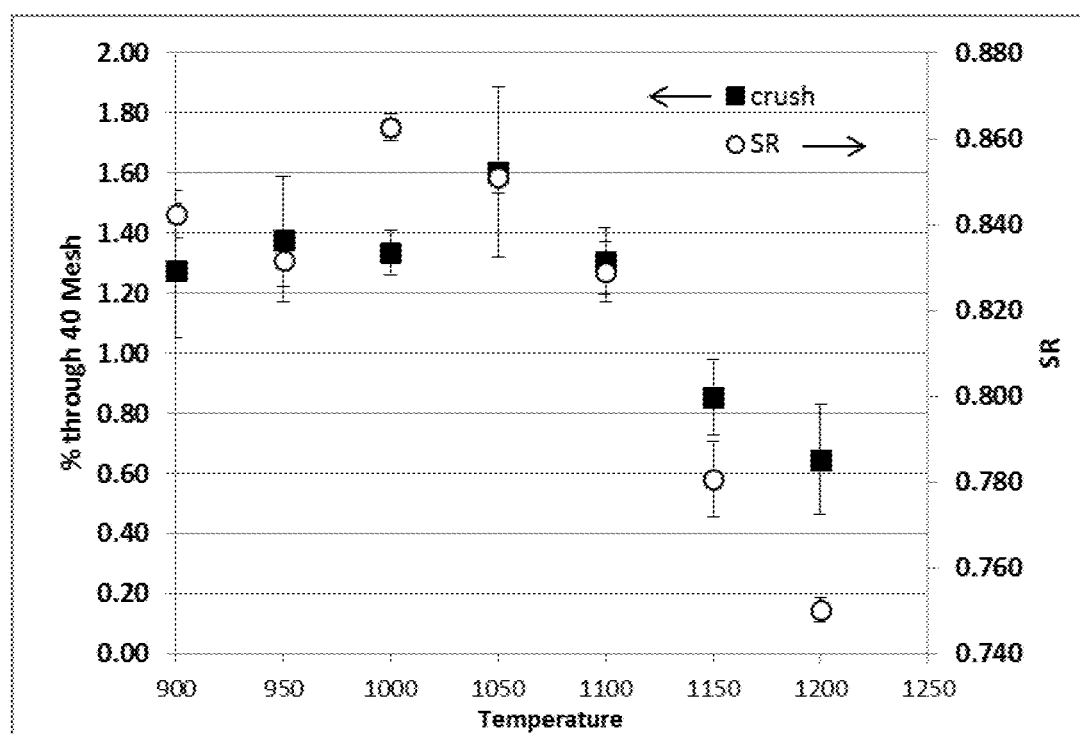
FIG. 24 is a graph of solar reflectance and crush strength data for granules made from nepheline syenite-containing mixtures at a variety of firing temperatures.
Figure 25:
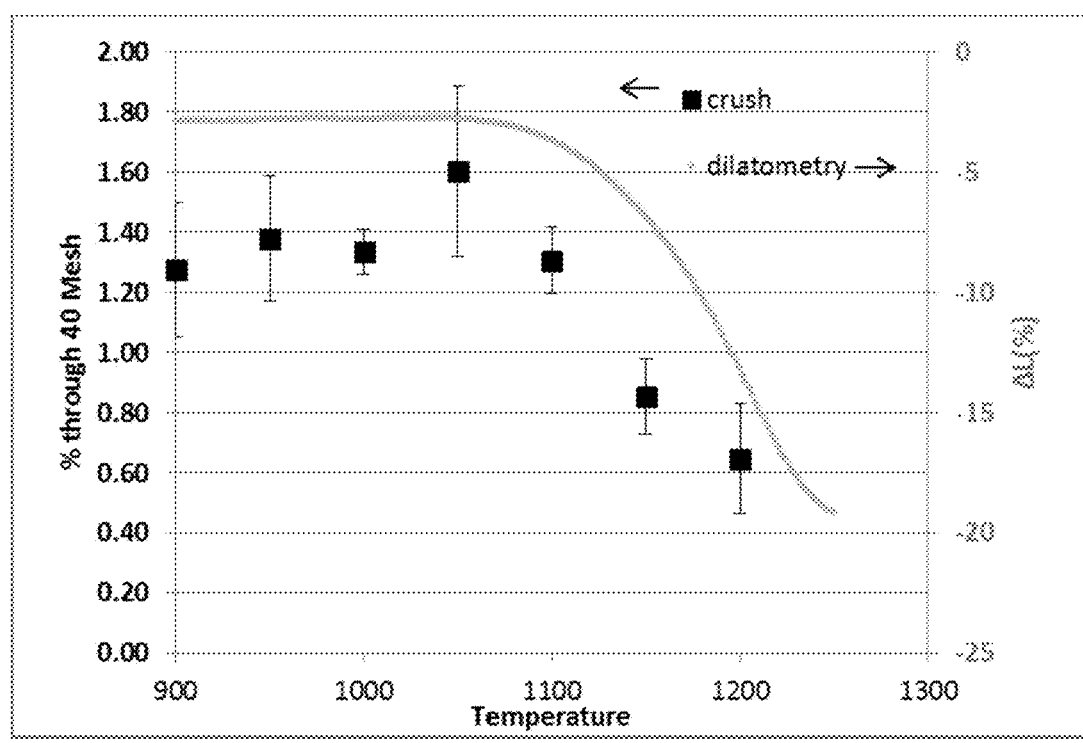
FIG. 25 is a graph of crush strength data and dilatometry data for granules made from nepheline syenite-containing mixtures at a variety of firing temperatures.

Notably, less than 1 wt % of cristobalite and no other crystalline silica phases were detected by XRD in granules sintered at 1100° C. and at 1150° C., and no crystalline silica at all was detected in the sample sintered at 1200° C. This result presents a great improvement of the final composition and achievement of "HSE friendly" roofing granules. FIG. 24 presents solar reflectance and crush strength data, and FIG. 25 presents crush strength and dilatometry data for granules fired at a variety of temperatures. The increase in crush strength with increasing firing temperature coincides quite well with linear shrinkage measured using dilatometry. And the reduction in solar reflectance at higher firing temperatures is consistent with more significant densification and a decrease in the presence of scattering centers on the granule surface.

Thus, the use of nepheline syenite in the mixture to be fired in combination with ZnO was found to result in high-SR (>83), high crush-resistance (>base rock) granules with crystalline silica content <1 wt % and at sintering temperatures as low as 900° C. This combination of properties, especially the low crystalline silica content, is advantageous for a solar-reflective roofing granule.

Figure 26:
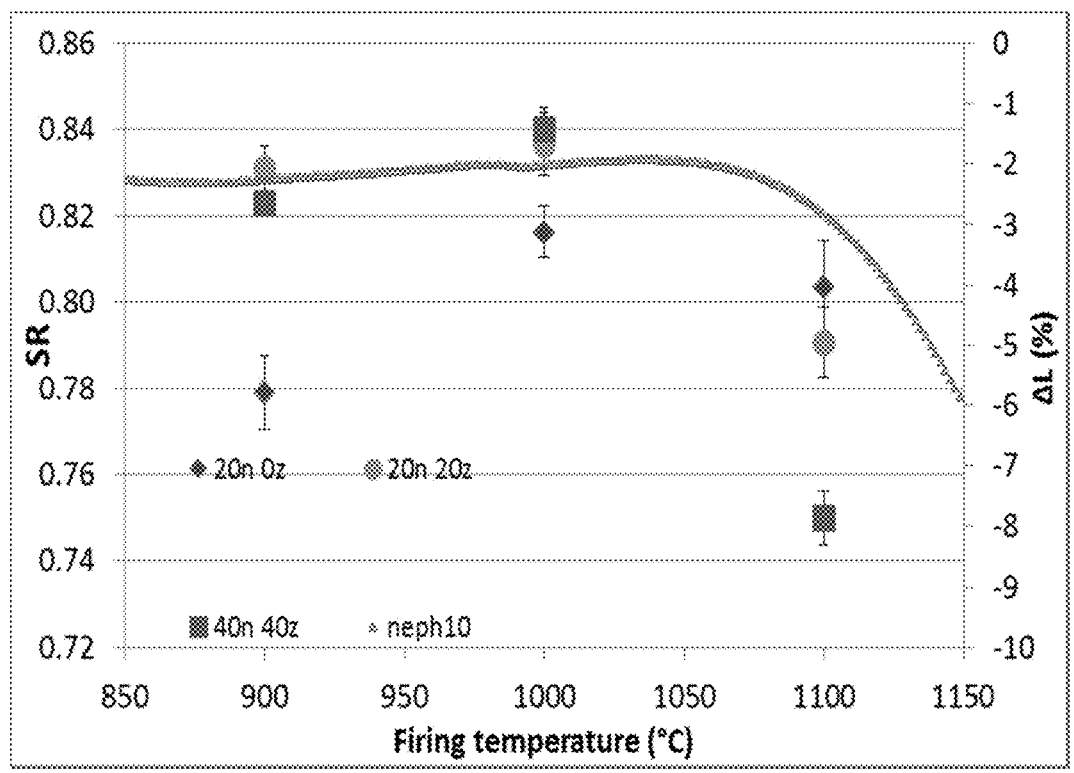
FIG. 26 is a graph of solar reflectivity and dilatometry data for granules made from nepheline syenite-containing mixtures.
Figure 27:
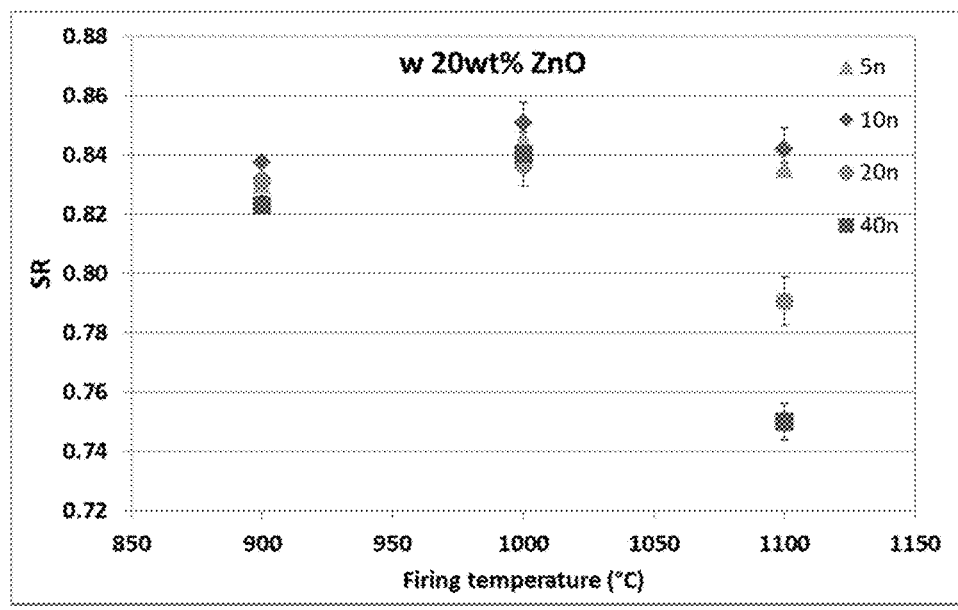
FIG. 27 is a graph of solar reflectivity data for granules made from nepheline syenite-containing mixtures.

FIGS. 26 and 27 provide solar reflectivity data for granules made as described above from mixtures including nepheline syenite and zinc oxide in varying amounts in kaolin clay. "Xn Yz" indicates X wt % nepheline syenite and Y wt % zinc oxide in the firable mixture. In FIG. 26, a dilatometry curve for 10 wt % nepheline syenite in kaolin is provided (see right axis). Notably, the addition of zinc oxide increases the solar reflectance. An increase in nepheline syenite reduces solar reflectance at higher firing temperatures where increased densification occurred (see dilatometry curve), but has minimal impact at lower firing temperatures.

Figure 28:
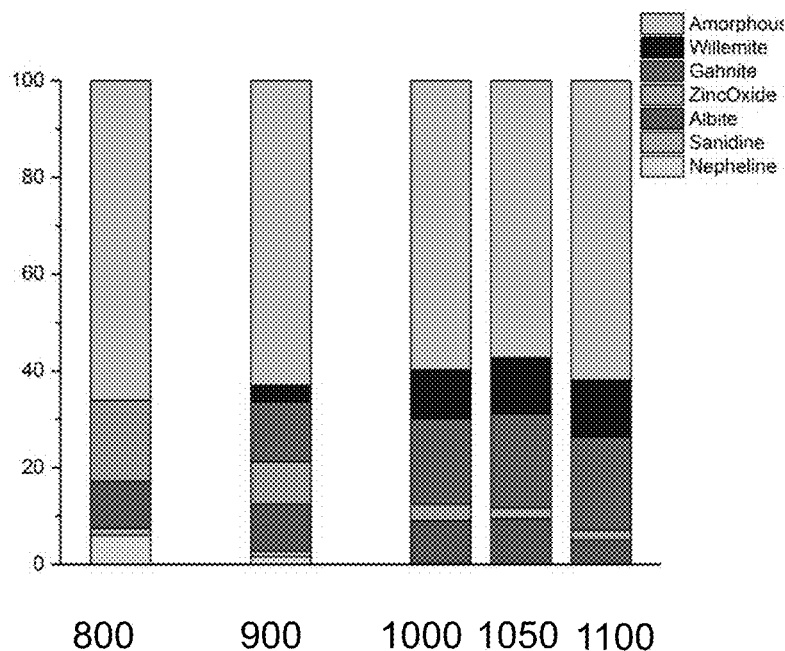
FIG. 28 is a chart of phase data for granules made from 20 wt % nepheline syenite and 20% zinc oxide in kaolin at different firing temperatures, on granules compacted on a roller compactor.

Notably, not only does the phase composition depend on firing temperature and components of the firable mixture, but also on granulation method. For example, FIG. 28 provides phase data for granules made from 20 wt % nepheline syenite and 20% zinc oxide in kaolin at different firing temperatures, on granules compacted on a roller compactor. The data are provided in the table below, in which values are provided in wt %.

| dataset | Nepheline | Sanidine | Albite | Zinc oxide | Gahnite | Willemite | Amorphous |
|---|---|---|---|---|---|---|---|
| 800 C. | 6.03 | 1.45 | 9.7 | 16.67 | 0 | 0 | 66.15 |
| 900 C. | 1.64 | 1.13 | 9.74 | 8.77 | 12.33 | 3.35 | 63.04 |
| 1000 C. | 0 | 0.16 | 8.88 | 3.42 | 17.65 | 10.07 | 59.82 |

-continued

| dataset | Nepheline | Sanidine | Albite | Zinc oxide | Gahnite | Willemite | Amorphous |
|---|---|---|---|---|---|---|---|
| 1050 C. | 0 | 0 | 9.42 | 2.33 | 19.34 | 11.63 | 57.28 |
| 1100 C. | 0 | 0 | 5.08 | 2.05 | 19.24 | 11.66 | 61.97 |

Figure 29:
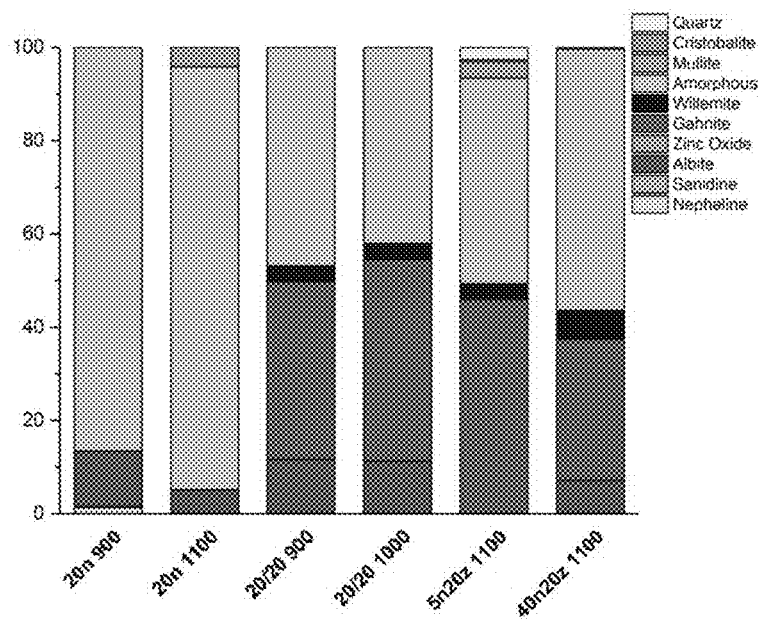
FIG. 29 is a chart of phase data for granules made with varying amounts of nepheline syenite and zinc oxide in kaolin, formed using a high-shear mixer.

FIG. 29 provides phase data for granules made with varying amounts of nepheline syenite and zinc oxide in kaolin, formed using a high-shear mixer using the procedures described above. The data are provided in the table below, in which values are provided in wt %.

| | Nepheline | Sanidine | Albite | Zincoxide | Gahnite |
|---|---|---|---|---|---|
| 20n, 900 C. | 1.32 | 0.26 | 11.89 | 0 | 0 |
| 20n, 1100 C. | 0 | 0 | 5.15 | 0 | 0 |
| 20/20, 900 | 0 | 0 | 11.6 | 0 | 38.18 |
| 20/20, 1000 | 0 | 0 | 11.34 | 0 | 43.2 |
| 5n20z, 1100 | 0 | 0 | 0 | 0 | 45.9 |
| 40n20z 1100 C. | 0 | 0 | 7.14 | 0 | 30.33 |

| | Willemite | Amorphous | Mullite | Cristobalite | Quartz |
|---|---|---|---|---|---|
| 20n, 900 C. | 0 | 86.53 | 0 | 0 | 0 |
| 20n, 1100 C. | 0 | 90.7 | 4.15 | 0 | 0 |
| 20/20, 900 | 3.37 | 46.85 | 0 | 0 | 0 |
| 20/20, 1000 | 3.42 | 42.04 | 0 | 0 | 0 |
| 5n20z, 1100 | 3.41 | 44.05 | 3.63 | 0.32 | 2.69 |
| 40n20z 1100 C. | 6.12 | 56.07 | 0 | 0.34 | 0 |

The two granulation methods provided different amounts of various crystalline and amorphous phases. The person of ordinary skill in the art can adjust granulation and firing parameters to further tune the phase composition.

Figure 30:
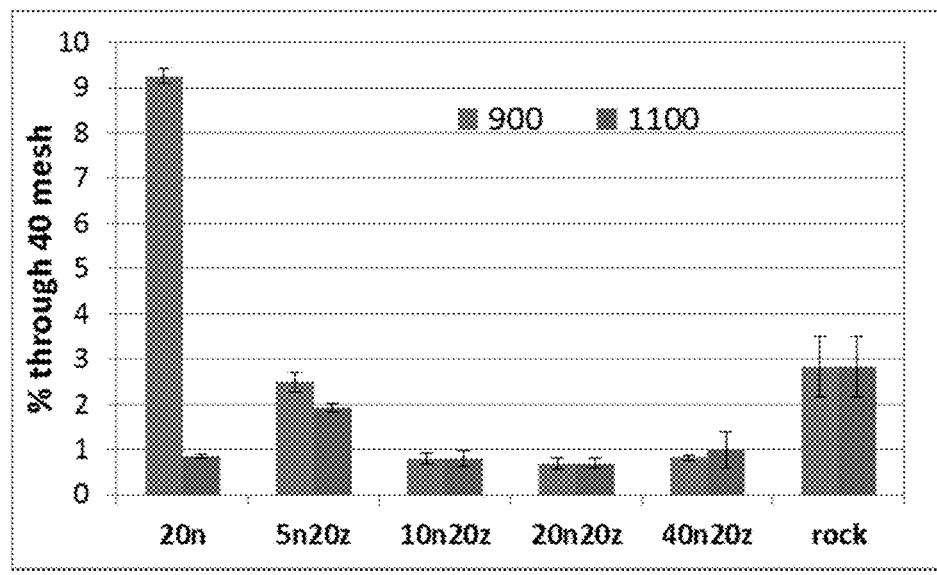
FIG. 30 is a graph of crush strength data for various nepheline syenite-based granules, granulated using a high-shear mixer, at two different firing temperatures.
Figure 31:
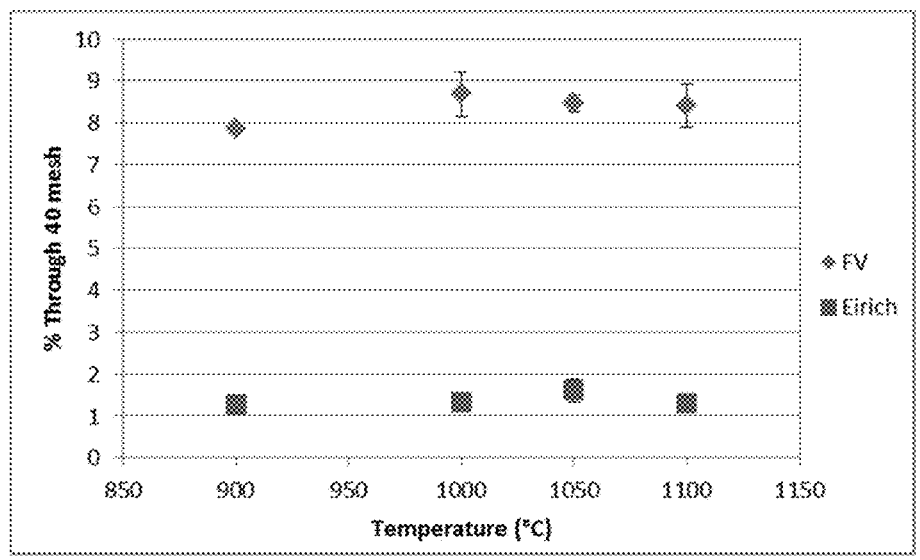
FIG. 31 is a graph of crush strength data vs. firing temperature for granules made from 20 wt % nepheline syenite and 20 wt % zinc oxide in kaolin clay, granulated by two different methods.

FIG. 30 provides additional crush strength data for various nepheline syenite-based granules, granulated using a high-shear mixer as described above, at two different firing temperatures. FIG. 31 provides crush strength data vs. firing temperature for granules made from 20 wt % nepheline syenite and 20 wt % zinc oxide in kaolin clay, granulated by two different methods (roller compactor and high-shear mixer, both as described above). The two different granulation methods provide granules with different mechanical properties, largely due to forming granules of different density. Granulation parameters can be tuned to provide a desired overall granule porosity and density.

Figure 32:
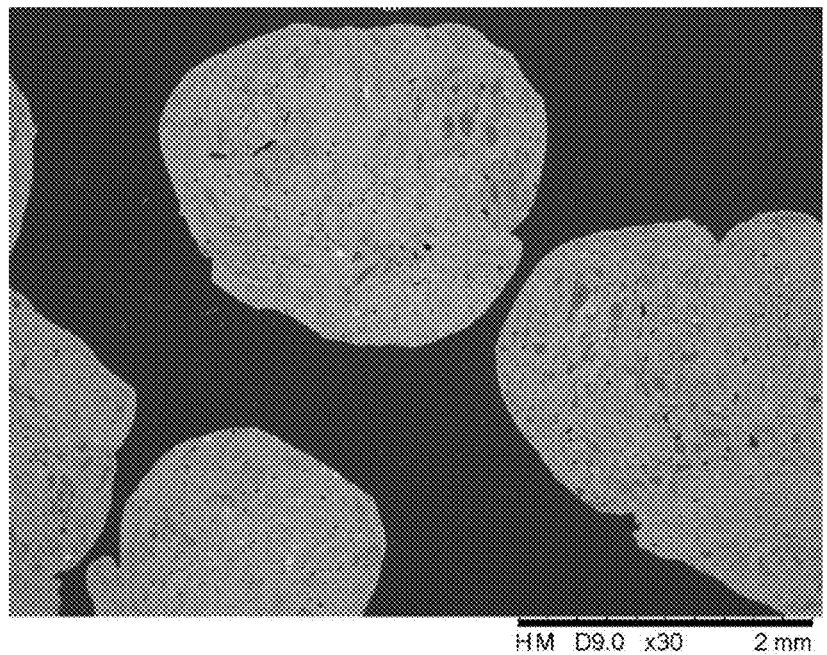
FIG. 32 is an SEM image of a granule fired at 1050° C. from a mixture granulated using a high-shear mixer.
Figure 33:
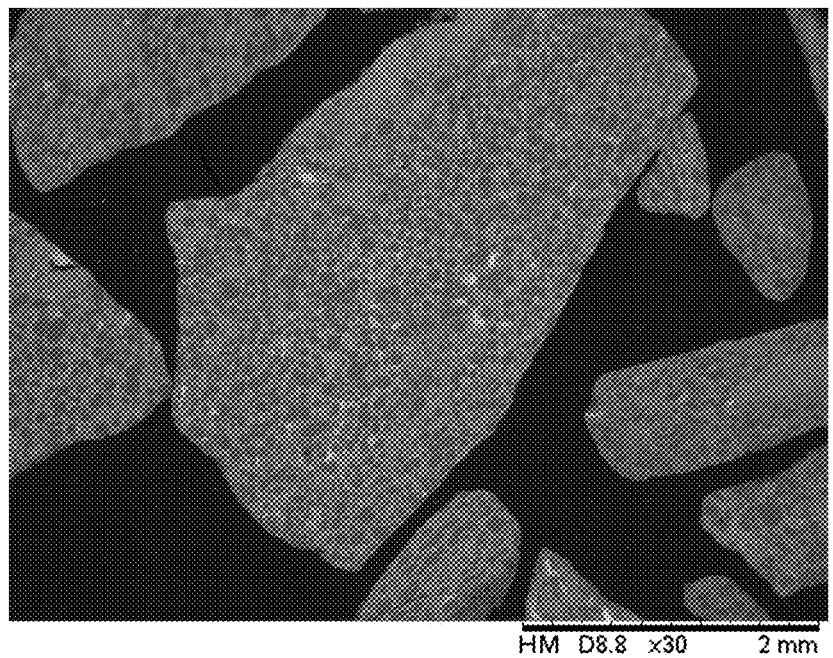
FIG. 33 is an SEM image of a granule fired at 1100° C. from a mixture granulated using roller compactor.
Figure 34:
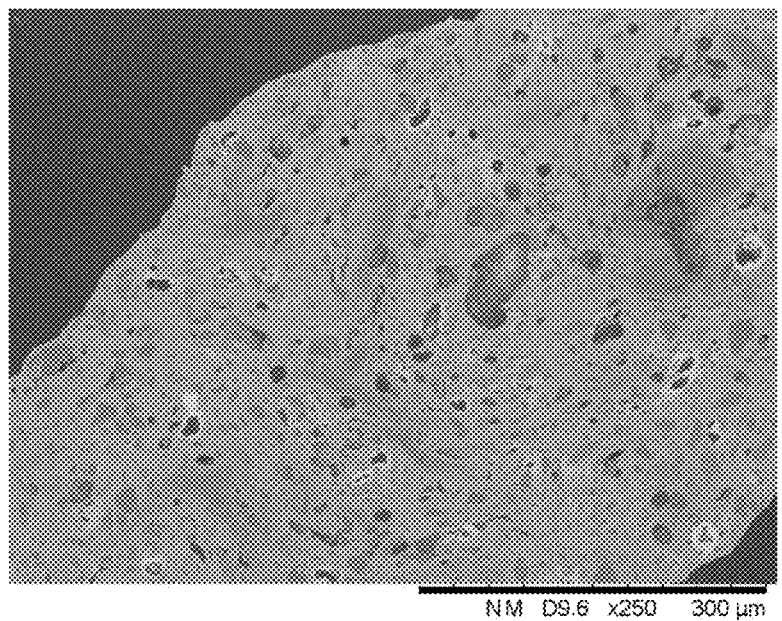
FIGS. 34-36 are images of granules fired at 1250° C., respectively granulated using a high-shear mixer; by roll compaction in a first roller compactor system; and by roll compaction in a second roller compactor system.
Figure 35:
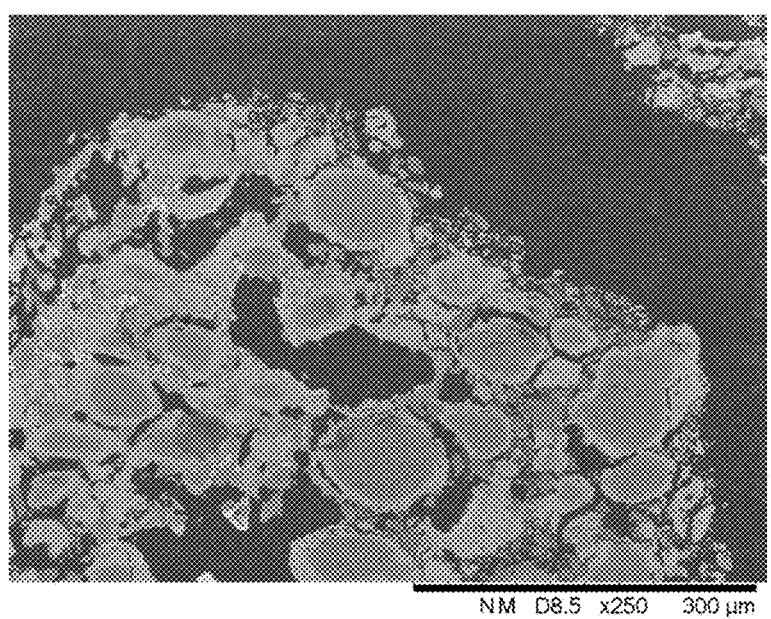
Figure 36:
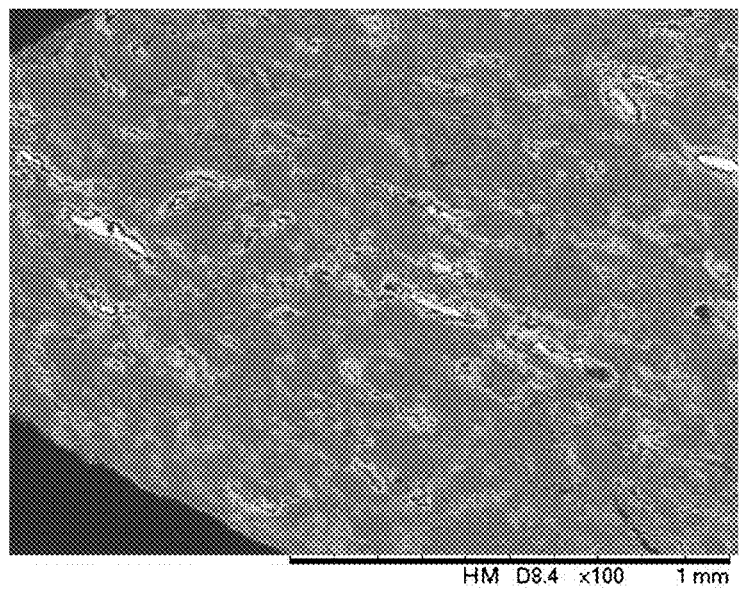
Figure 37:
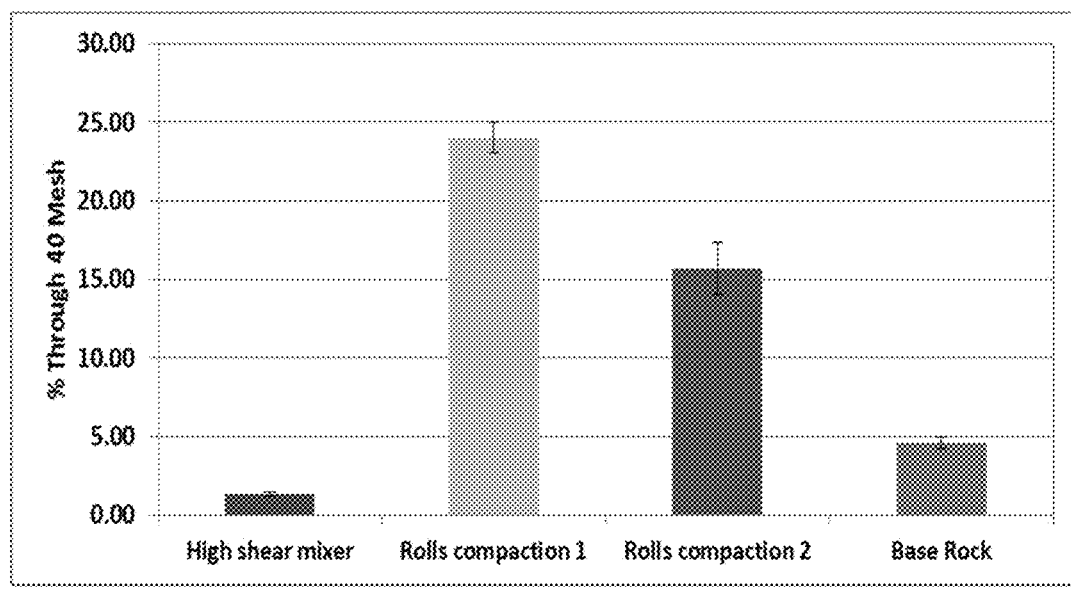
FIG. 37 is a graph of crush strength data for the granules of FIGS. 34-36.

SEM was performed on such granules; images are shown in FIGS. 32 (high-shear mixer, fired at 1050° C.) and 33 (roller compactor, fired at 1100° C.). Gross morphological differences are visible. FIGS. 34-36 are images of such granules fired at 1250° C., respectively granulated using the high-shear mixer as described above; by roll compaction using a first roller compactor system; and by roll compaction using a different roller compactor system. Crush strength data for these are presented in FIG. 37.

Figure 38:
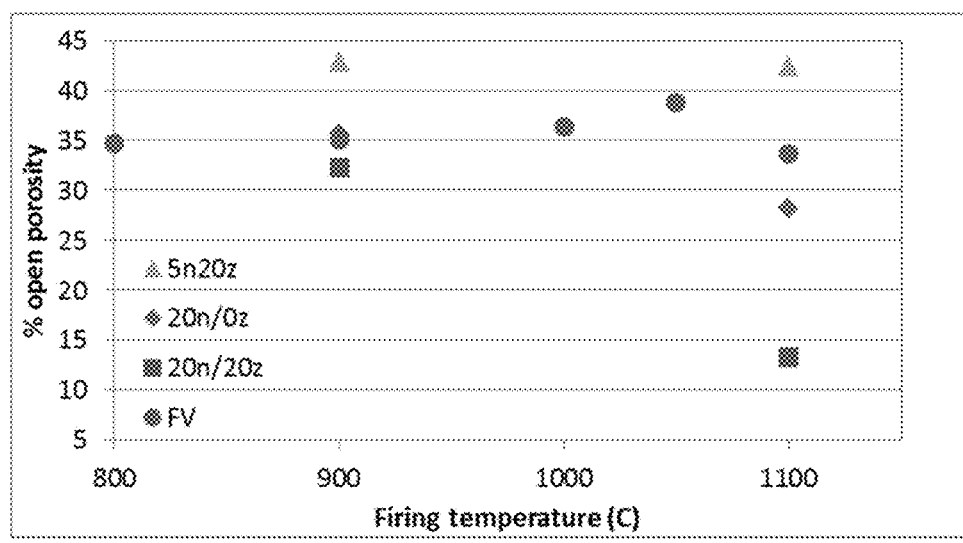
FIG. 38 is a graph of mercury porosimetry data for various nepheline syenite-based granules fired at various temperatures.

Mercury porosimetry data for various nepheline syenite-based granules fired at various temperatures are provided in FIG. 38. The 5n20z, 20n/0z and 20n/20z samples were granulated using the high-shear mixer as described above. The FV sample is 20n/20z, granulated using roller compaction on a roller compactor.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A mineral roofing granule comprising a mineral body and a mineral outer surface, the mineral roofing granule having at its mineral outer surface a first fired material, the first fired material being a fired product of a first fireable mixture comprising:
    kaolin clay present in the first fireable mixture in an amount in the range of 40-90 wt %;
    a zinc source present in the first fireable mixture in an amount in the range of 10-30 wt %; and
    one or more of
        a feldspar present in the first fireable mixture in an amount in the range of 5-40 wt % and
        a nepheline syenite present in the first fireable mixture in an amount in the range of 5-40 wt %.

2. The mineral roofing granule of claim 1, wherein the mineral outer surface has a surface porosity of no more than about 5% as measured by mercury porosimetry.

3. The mineral roofing granule of claim 1, wherein the first fireable mixture comprises the feldspar.

4. The mineral roofing granule of claim 3, wherein the feldspar is present in the first fireable mixture in an amount in the range of 10-40 wt %.

5. The mineral roofing granule of claim 1, wherein the first fireable mixture comprises the nepheline syenite, the nepheline syenite being present in an amount in the range of 10-40 wt %.

6. The mineral roofing granule of claim 1, wherein at least 50% of the zinc present in the first fired material is present as a zinc oxide, a zinc aluminosilicate or a zinc silicate.

7. The mineral roofing granule of claim 1, wherein the first fired material comprises $ZnAl_2O_4$, wherein no more than 40% of the zinc present in the first fired material is present as $ZnAl_2O_4$.

8. The mineral roofing granule of claim 1, having a density in the range of about 2.25 g/mL to about 3.25 g/mL.

9. The mineral roofing granule of claim 1, wherein the mineral body comprises a mineral shell disposed about a mineral core, the outer surface of the mineral shell being the mineral outer surface of the mineral roofing granule, the mineral shell being of the first fired material.

10. The mineral roofing granule of claim 1, having a solar reflectance of at least 80%.

11. The mineral roofing granule of claim 1, having a stain resistance drop of no more than 3 percentage points.

12. The mineral roofing granule of claim 1, lacking a coating disposed on its mineral outer surface.

13. The mineral roofing granule of claim 1, wherein the first fired mixture comprises $ZnAl_2O_4$ and $Zn_2SiO_4$.

14. The mineral roofing granule of claim 1, wherein the mineral body has a porosity greater than the mineral outer surface.

15. A roofing membrane or shingle including a collection of mineral roofing granules of claim 1 embedded in a bituminous surface of the roofing membrane or shingle.

16. A mineral roofing granule comprising a mineral body and a mineral outer surface, the mineral roofing granule having at its mineral outer surface a first fired material, the first fired material being a fired product of a first fireable mixture comprising:
- kaolin clay present in the first fireable mixture in an amount in the range of 40-90 wt %;
- a zinc source present in the first fireable mixture in an amount in the range of 10-30 wt %; and
- a nepheline syenite present in the first fireable mixture in an amount in the range of 5-40 wt %,
- wherein the first fireable mixture has less than 0.5 wt % feldspar.

17. The mineral roofing granule of claim 16, wherein the first fireable mixture comprises the nepheline syenite present in an amount in the range of 10-40 wt %, and wherein the first fireable mixture has less than 0.5 wt % feldspar and less than 0.5 wt % sodium silicate.

18. A mineral roofing granule comprising a mineral body and a mineral outer surface, the mineral roofing granule having at its mineral outer surface a first fired material, the first fired material being a fired product of a first fireable mixture comprising:
- kaolin clay present in the first fireable mixture in an amount in the range of 40-90 wt %;
- a zinc source present in the first fireable mixture in an amount in the range of 10-30 wt %; and
- a feldspar present in the first fireable mixture in an amount in the range of 5-40 wt %,
- wherein the first fireable mixture has less than 0.5 wt % nepheline syenite.

19. A method for making a mineral roofing granule of claim 1, comprising
- providing a green granule having at its outer surface a first fireable mixture comprising an kaolin clay and one or more of a feldspar, a sodium silicate and a nepheline syenite, and
- firing the green granule to provide the mineral roofing granule, the firing converting the first fireable mixture to the first fired material.

\* \* \* \* \*